(12) United States Patent
Ishimura et al.

(10) Patent No.: US 7,466,219 B2
(45) Date of Patent: Dec. 16, 2008

(54) COMMUNICATION DEVICE AND DISTANCE CALCULATION SYSTEM

(75) Inventors: Shizuka Ishimura, Gunma-ken (JP);
Akira Iketani, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 480 days.

(21) Appl. No.: 11/245,497

(22) Filed: Oct. 7, 2005

(65) Prior Publication Data
US 2006/0083406 A1    Apr. 20, 2006

(30) Foreign Application Priority Data
Oct. 19, 2004 (JP) ............................. 2004-304756
Oct. 19, 2004 (JP) ............................. 2004-304757
Oct. 19, 2004 (JP) ............................. 2004-304758

(51) Int. Cl.
*B60Q 1/00* (2006.01)
(52) U.S. Cl. ..................... 340/435; 340/5.61; 342/125
(58) Field of Classification Search ................. 340/435, 340/5.61, 5.64; 342/125
See application file for complete search history.

(56) References Cited

U.S. PATENT DOCUMENTS 4,757,315 A * 7/1988 Lichtenberg et al. ........ 342/125
5,293,160 A * 3/1994 Kurozu et al. ................ 340/5.3
5,309,144 A * 5/1994 Lacombe et al. ........ 340/539.23
6,346,878 B1   2/2002 Pohlman et al.
6,803,851 B1 * 10/2004 Kramer et al. ............. 340/5.61
2003/0090365 A1 * 5/2003 Bergerhoff ................. 340/5.61

FOREIGN PATENT DOCUMENTS

JP    2000-198420    7/2000

* cited by examiner

*Primary Examiner*—Jeff Hofsass
*Assistant Examiner*—Edny Labbees
(74) *Attorney, Agent, or Firm*—SoCal IP Law Group LLP; Steven C. Sereboff; John E. Gunther

(57) ABSTRACT

A communication device (e.g., an vehicle-mounted device) comprises a transmitter that transmits a distance-calculation signal with which to calculate a distance to a partner communication device (e.g., a mobile device), a detector that receives the distance-calculation signal returned from the partner communication device and detects a phase difference between the distance-calculation signal when transmitted and the distance-calculation signal when received, and a calculator that calculates the distance to the partner communication device based on the phase difference detected by the detector.

20 Claims, 12 Drawing Sheets

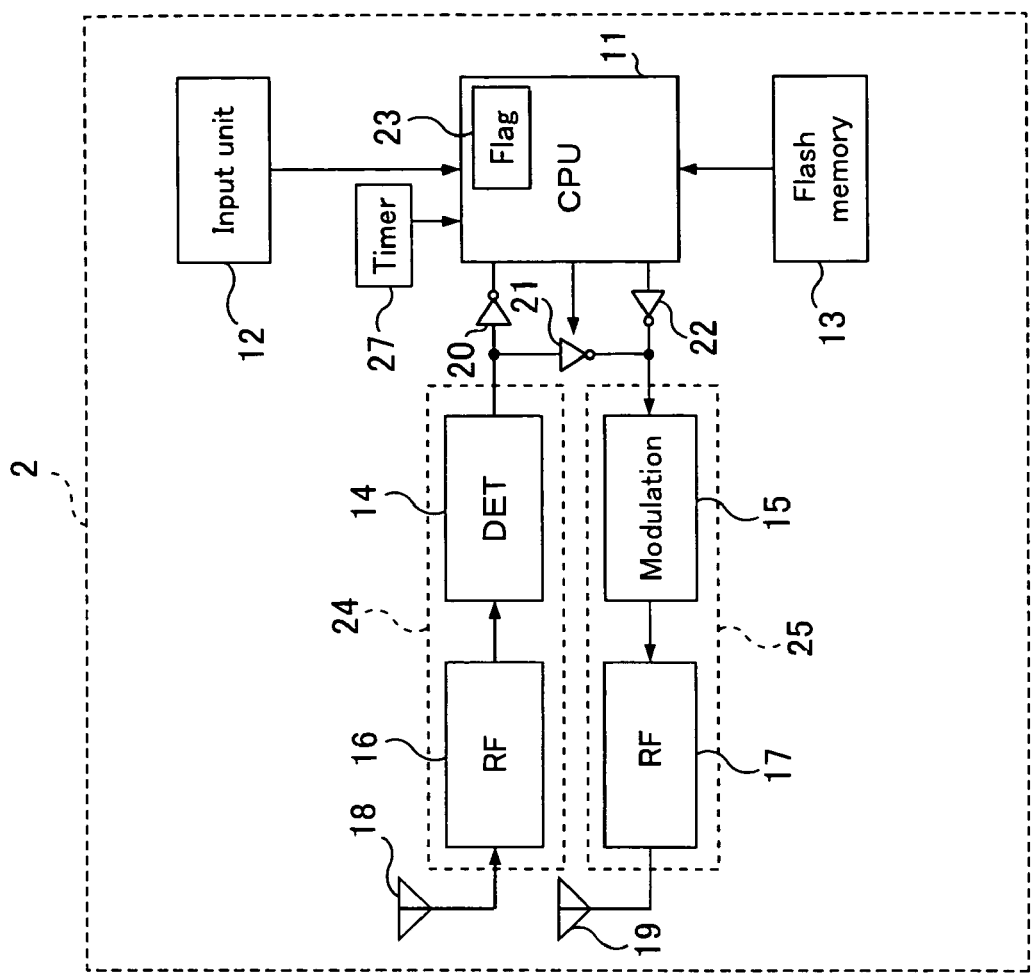
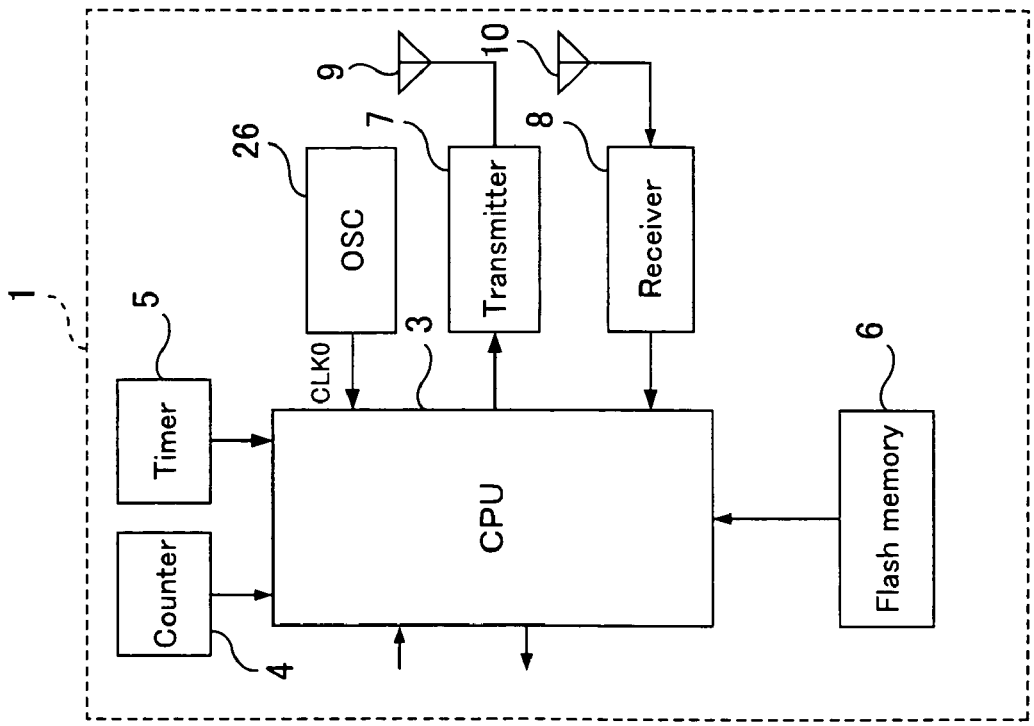
Fig.1

COMMUNICATION DEVICE AND DISTANCE CALCULATION SYSTEM

CROSS-REFERENCE TO RELATED APPLICATIONS

The present application claims priority from Japanese Patent Applications No. 2004-304756, No. 2004-304757, and No. 2004-304758 filed on Oct. 19, 2004, which are herein incorporated by reference.

BACKGROUND OF THE INVENTION

1. Field of the Invention

The present invention relates to a communication device and a distance calculation system.

2. Description of the Related Art

In these years, among communication devices that communicate with each other to perform prescribed processing are, for example, vehicle-mounted and mobile devices for vehicles having a passive keyless entry system mounted therein.

Communications between the vehicle-mounted and mobile devices for vehicles having a passive keyless entry system mounted therein will be described below in detail. It is supposed that the vehicle-mounted device is installed, e.g., in the driver side door of a vehicle and that the owner of the vehicle (hereinafter called a wearer) has the mobile device with him. Further, it is supposed that the wearer has stopped the engine of the vehicle, opened the door, and left the vehicle.

The vehicle-mounted device transmits a signal (hereinafter called a signal A) to determine whether the mobile device is within a range (area) in which the vehicle-mounted device and the mobile device can communicate. When the wearer is within the communication-feasible range, the mobile device receives the signal A from the vehicle-mounted device, and transmits a signal B in response to the signal A. When receiving the signal B from the mobile device, the vehicle-mounted device determines that the mobile device is within the communication-feasible range. The transmission of the signal A from the vehicle-mounted device is repeated at predetermined intervals.

If the wearer goes outside the communication-feasible range, the mobile device cannot receive the signal A from the vehicle-mounted device. Hence, the vehicle-mounted device gets to not receive the signal B from the mobile device in response to the signal A. For example, when not receiving the signal B from the mobile device for a predetermined time period, the vehicle-mounted device sends an instruction signal to lock the doors of the vehicle to a controller provided separately in the vehicle. The controller locks the doors of the vehicle according to the instruction signal. Thus, when the wearer leaves the vehicle and goes outside the communication-feasible range, the doors of the vehicle are locked.

Next, when the wearer, who was out of the communication-feasible range, has got back into the communication-feasible range, the mobile device receives the signal A from the vehicle-mounted device, and transmits the signal B. When receiving the signal B from the mobile device, the vehicle-mounted device transmits a read signal to read out information of the mobile device to determine whether the mobile device is corresponding to the vehicle. If determining that the mobile device is corresponding to the vehicle, the vehicle-mounted device sends an instruction signal to unlock the doors of the vehicle to the controller. The controller unlocks the doors of the vehicle according to the instruction signal.

In this way, in the vehicle having the passive keyless entry system mounted, it is possible that the doors of the vehicle are locked and unlocked through communications between the vehicle-mounted device and the mobile device without inserting a vehicle key into the key hole. See for example Japanese Patent Application Laid-Open Publication No. 2000-198420.

However, with vehicles having the passive keyless entry system mounted, when a so-called relay attack is made in the above-described communications between the vehicle-mounted device and the mobile device, there is a possibility that the vehicle may be stolen. This relay attack refers to a kind of theft wherein in the state where, the wearer being out of the communication-feasible range, the vehicle-mounted device and the mobile device otherwise could not communicate, by using a relay the vehicle-mounted device and the mobile device are made to be able to communicate, thereby unlocking the doors of the vehicle to allow the vehicle to be stolen.

The relay attack will be described below in detail using FIG. 12. FIG. 12 is a diagram showing communications between a vehicle-mounted device 101 and a mobile device 102 via relays A and B. The vehicle-mounted device 101 is installed, e.g., in the driver side door and transmits the signal A. The vehicle-mounted device 101 can transmit and receive signals within a communication range denoted by a broken line C. When receiving the signal A from the vehicle-mounted device 101, the mobile device 102 transmits the signal B in response to the signal A as described above. Note that the mobile device 102 can transmit and receive signals within a communication range denoted by a broken line D.

If the wearer goes outside the communication-feasible range, the signal B in response to the signal A is not transmitted from the mobile device 102 to the vehicle-mounted device 101 and a controller (not shown) locks the doors according to an instruction signal from the vehicle-mounted device 101 as described above.

Here, suppose that there are intermediaries X and Y intending to steal the vehicle, the intermediary X carrying the relay A enters the communication range C of the vehicle-mounted device 101. And the intermediary Y carrying the relay B comes close to the wearer, with having the relay B enter the communication range D of the mobile device 102. The relay A being carried by the intermediary X receives the signal A since being within the communication range C, and detects and amplifies the signal A, and transmits the amplified signal A. Since amplifying the signal A, the relay A can transmit the signal A over a broader range than the communication range C of the vehicle-mounted device 101. When receiving the signal A amplified by the relay A, the relay B being carried by the intermediary Y detects the amplified signal A and attenuates the signal A to, e.g., the level before amplified by the relay A and transmits the attenuated signal A. Here, since the relay B is within the communication range D of the mobile device 102, the mobile device 102 receives the signal A attenuated by the relay B. Considering that the signal A from the vehicle-mounted device 101 has been received, the mobile device 102 transmits the signal B in response to the signal A. When receiving the signal B, the relay B detects, and amplifies the signal B and transmits the amplified signal B. Since amplifying the signal B, the relay B can transmit the signal B over a broader range than the communication range D of the mobile device 102. When receiving the signal B amplified by the relay B, the relay A detects the amplified signal B and attenuates the signal B to, e.g., the level before amplified by the relay B and transmits the attenuated signal B. Here, since the relay A is within the communication range C of the vehicle-mounted device 101, the vehicle-mounted device 101 receives the signal B attenuated by the relay A. Since receiving the signal B in response to the signal A, the vehicle-mounted device 101 determines that the mobile device 102 is within the communication-feasible range. Then, the vehicle-mounted device 101 performs the previously described process to unlock the doors of the vehicle. Thus, for example, the intermediary X gets in the unlocked vehicle and steals the vehicle.

With communications between the vehicle-mounted device 101 and the mobile device 102 via relays A and B, the signal B is received via relays A and B and then the vehicle-mounted device 101 may determine that the mobile device 102 is within the communication-feasible range. Thus, the vehicle-mounted device 101 may send the instruction signal to unlock the doors of the vehicle to the controller, thus unlocking the doors by the controller, although the wearer is not within the communication-feasible range.

SUMMARY OF THE INVENTION

Accordingly, an object of the present invention is to provide a communication device that reliably can calculate the distance to a partner communication device (e.g., a mobile device) in order to prevent unauthorized communications by others than concerned parties in communicating with the partner communication device. Moreover, an object of the present invention is to provide a communication device that reliably can calculate the distance to a partner communication device (e.g., an vehicle-mounted device) in order to prevent unauthorized communications by others than concerned parties in communicating with the partner communication device. Furthermore, an object of the present invention is to provide a distance calculation system that reliably can calculate the distance between a first communication device (e.g., an vehicle-mounted device) and a second communication device (e.g. a mobile device) in order to prevent unauthorized communications by others than concerned parties in communications between the first and second communication devices.

According to the present invention to solve the above and other problems, there is provided a communication device comprising a transmitter that transmits a distance-calculation signal with which to calculate a distance to a partner communication device (e.g., a mobile device), a detector that receives the distance-calculation signal returned from the partner communication device and detects a phase difference between the distance-calculation signal when transmitted and the distance-calculation signal when received, and a calculator that calculates the distance to the partner communication device based on the phase difference detected by the detector.

Further, there is provided a communication device capable of communicating with a partner communication device (e.g., an vehicle-mounted device) which transmits a distance-calculation signal with which to calculate a distance to the communication device, receives the distance-calculation signal returned, detects a phase difference between the distance-calculation signal when transmitted and the distance-calculation signal when received, and calculates the distance to the communication device based on the phase difference. The communication device comprises a send-back section that returns the distance-calculation signal transmitted by the partner communication device.

Yet further, there is provided a distance calculation system which calculates a distance between first and second communication devices (e.g., an vehicle-mounted device and a mobile device), wherein the first communication device comprises a transmitter that transmits a distance-calculation signal with which to calculate a distance to the second communication device, a detector that receives the distance-calculation signal returned from the second communication device and detects a phase difference between the distance-calculation signal when transmitted and the distance-calculation signal when received, and a calculator that calculates the distance to the second communication device based on the phase difference detected by the detector, and wherein the second communication device comprises a send-back section that returns the distance-calculation signal transmitted by the first communication device.

Features and objects of the present invention other than the above will become apparent from the description of this specification and the accompanying drawings.

BRIEF DESCRIPTION OF THE DRAWINGS

For a more complete understanding of the present invention and the advantages thereof, reference is now made to the following description taken in conjunction with the accompanying drawings wherein:

FIG. 1 is a function block diagram showing an example of the whole configuration of a distance calculation system according to the present invention;

DETAILED DESCRIPTION OF THE INVENTION

Figure 2:
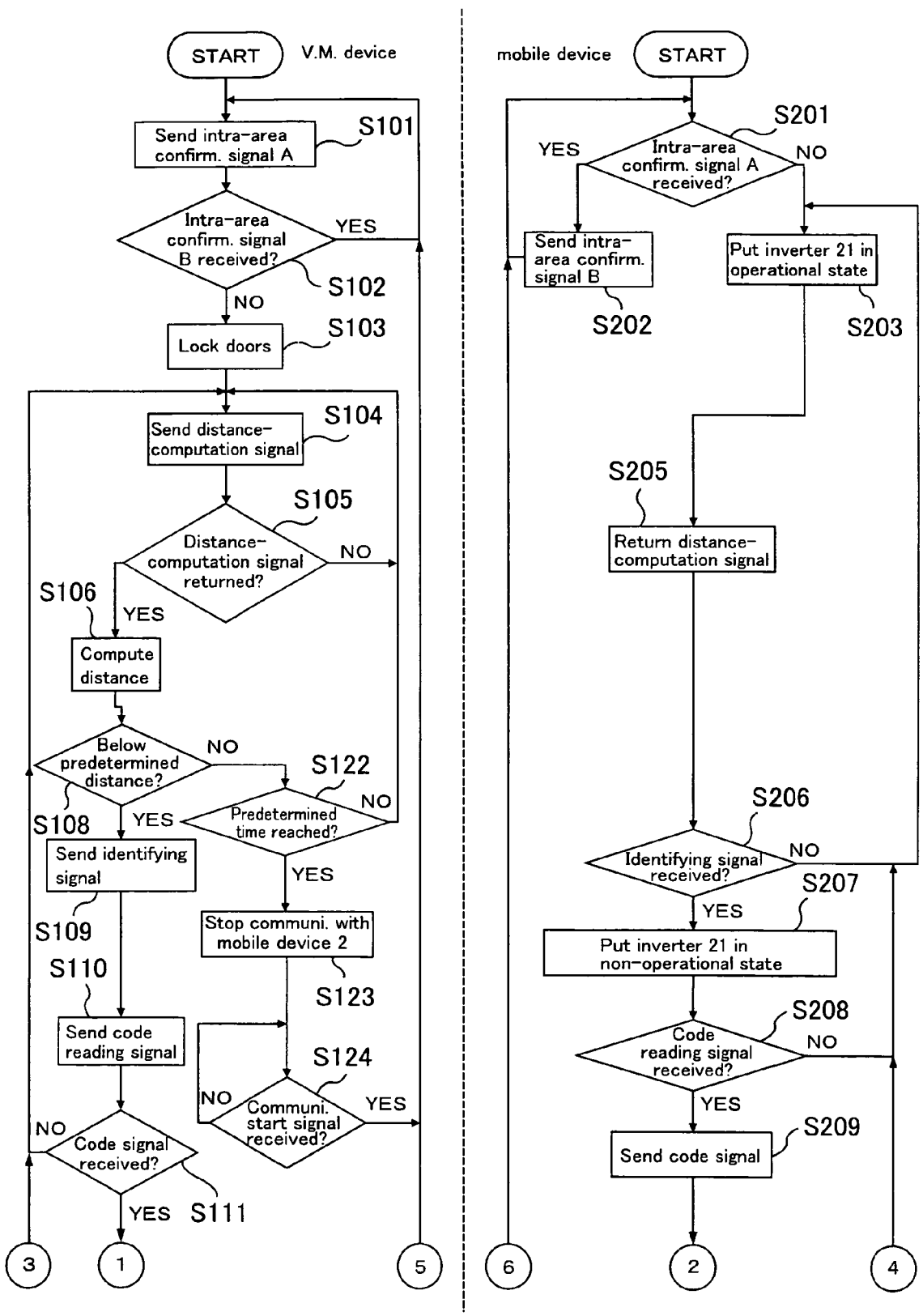
FIG. 2 is a flow chart showing an example of the operation of the distance calculation system according to the present invention.

At least the following matters will be made clear by the explanation in the present specification and the description of the accompanying drawings.

<<First Implementation<<

==Entire Configuration of Distance Calculation System==

A communication device constituting a distance calculation system of the present invention will be described with reference to FIG. 1. FIG. 1 is a function block diagram showing an example of the entire configuration of the distance calculation system according to the present invention.

In the present implementation, the case will be described where the distance calculation system is used in a passive keyless entry system, which can lock and unlock the doors of a vehicle without key operation. The distance calculation system comprises a vehicle-mounted device 1 (first communication device/communication device/partner communication device) and a mobile device 2 (second communication device/communication device/partner communication device). It is supposed that the vehicle-mounted device 1 is installed, for example, in the external door knob of the driver side door of a vehicle and the mobile device 2 is installed, for example, in a key for the vehicle.

In the present implementation, a carrier wave of a low frequency (e.g., 125 kHz) is used for communication of signals from the vehicle-mounted device 1 to the mobile device 2, and a carrier wave of a high frequency (e.g., 312 MHz) is used for communication of signals from the mobile device 2 to the vehicle-mounted device 1. That is, in the communication from the vehicle-mounted device 1 to the mobile device 2, communication speed is slow since communicating with the carrier wave of the low frequency, and meanwhile, in the communication from the mobile device 2 to the vehicle-mounted device 1, communication speed is fast since communicating with the carrier wave of the high frequency. The reason why the low frequency resulting in slow communication speed is used is to intentionally produce a phase difference (or time difference) between the time when the vehicle-mounted device 1 transmits a signal and the time when the signal is returned thereto by the mobile device 2. For the communication from the mobile device 2 to the vehicle-mounted device 1, the high frequency resulting in fast communication speed is used, and hence a phase difference between when transmitted and when received is negligible compared with a phase difference that occurs in the communication from the vehicle-mounted device 1 to the mobile device 2. That is, the distance between the vehicle-mounted device 1 and the mobile device 2 can be calculated from only the phase difference produced in the communication from the vehicle-mounted device 1 to the mobile device 2. This is the reason why the low frequency is used for the communication from the vehicle-mounted device 1 to the mobile device 2 and the high frequency is used for the communication from the mobile device 2 to the vehicle-mounted device 1.

Furthermore, in the communication from the vehicle-mounted device 1 to the mobile device 2, ASK (Amplitude Shift Keying)-modulated signals are communicated. This is because a transmitter (transmitter/modulator) 7 that transmits signals from the vehicle-mounted device 1 to the mobile device 2 and a demodulator 24 that receives signals from the vehicle-mounted device 1 are easy to be configured and thus the transmission from the vehicle-mounted device 1 to the mobile device 2 is possible even if there is cross talk. Meanwhile, in the communication 30 from the mobile device 2 to the vehicle-mounted device 1, FSK (Frequency Shift Keying)-modulated signals are communicated. This is because the FSK-modulated signals are not easily affected by noise and it is possible to reliably send information from the mobile device 2 to the vehicle-mounted device 1 without loss.

Furthermore, in the communication from the vehicle-mounted device 1 to the mobile device 2, the carrier wave of the low frequency is used and hence, the usual communication distance is about 1 meter because the intensity of the magnetic field component of the electromagnetic wave is inversely proportional to the distance cubed. Meanwhile, in the communication from the mobile device 2 to the vehicle-mounted device 1, the carrier wave of the high frequency is used and hence, the usual communication distance is about 5 to 20 meters. Hereinafter, the communication-feasible ranges of the vehicle-mounted device 1 and the mobile device 2 are called areas.

The vehicle-mounted device 1 comprises a CPU (Central Processing Unit; detector/calculator/determining section/generator) 3, a counter 4, a timer 5, a Flash memory (storage) 6, a transmitter 7, a receiver (demodulator) 8, a transmit antenna 9, a receive antenna 10, and an OSC (oscillator) 26.

The transmitter 7 ASK-modulates a signal from the CPU 3 with the carrier wave of 125 kHz in frequency.

The transmit antenna 9 transmits the ASK-modulated signal by the transmitter 7.

The receive antenna 10 receives the FSK-modulated signal from the mobile device 2.

The receiver 8 demodulates the FSK-modulated signal from the mobile device 2 received by the receive antenna 10.

The CPU 3 is provided to control the vehicle-mounted device 1 overall. Program code for the CPU 3 performing processes described later is stored beforehand in the Flash memory 6. Also stored beforehand in the Flash memory 6 are a code signal and personal data, which are to be verified with data demodulated by the receiver 8 from the mobile device 2 when the CPU 3 performs processing to unlock the doors of the vehicle. Yet further, stored beforehand in the Flash memory 6 is a decryption program for decrypting encrypted personal data demodulated by the receiver 8 from the mobile device 2 (the encrypted personal data being stored in a Flash memory 13 of the mobile device 2 and to be verified by the CPU 3 with the personal data in the Flash memory 6). The Flash memory 6 is constituted by a non-volatile memory, where data is electrically erasable and can be repeatedly written and read out.

The timer 5 measures time according to an instruction from the CPU 3.

The OSC 26 sends a clock signal (CLK0) of a predetermined frequency to the CPU 3.

The counter 4, according to an instruction from the CPU 3, counts the rising edges, e.g., of the clocks from the OSC 26, starting from the rising edge of a signal for calculating the distance from the vehicle-mounted device 1 to the mobile device 2 (hereinafter called a distance-calculation signal) that is sent from the CPU 3 to the transmitter 7 until the rising edge of the distance-calculation signal demodulated in the receiver 8. The count of the counter 4 is reset according to an instruction from the CPU 3.

The CPU 3 sends the distance-calculation signal to the transmitter 7 and resets the counter 4 to start counting. Also, the CPU 3 resets the timer 5 to start measuring time. When receiving the distance-calculation signal demodulated in the receiver 8 from the mobile device 2, the CPU 3 reads out the count of the counter 4 and calculates the distance from the vehicle-mounted device 1 to the mobile device 2 based on the count. That is, the count is obtained indicating the phase difference between the distance-calculation signal when sent to the transmitter 7 and the same when returned from the mobile device 2, and the CPU 3 can calculates the distance from the vehicle-mounted device 1 to the mobile device 2. For example, where the frequency of the clock from the OSC 26 is 15.75 kHz, if the count of the counter 4 at the time when the distance-calculation signal is returned from the mobile device 2 is at 250, the phase difference is about 15.87 msec. And suppose that when the phase difference is about 15.87 msec, the distance from the vehicle-mounted device 1 to the mobile device 2 has been found to be about 1 meter through experiment, for example. Distance data corresponding to the count obtained through experiment is stored beforehand as tabular data in the Flash memory 6. The CPU 3 determines whether the distance calculated is below a predetermined distance (e.g., 1 meter). When determining that the distance calculated is below the predetermined distance, the CPU 3 sends the transmitter 7 a signal (hereinafter called an identifying signal) to put an inverter 21 of the mobile device 2 in a non-operational state. Further, the CPU 3 sends the transmitter 7 a signal (hereinafter called a code reading signal) to read out a code signal from the mobile device 2, which is corresponding to the code signal stored in the Flash memory 6. The code signal from the mobile device 2 demodulated in the receiver 8 is sent to the CPU 3. If determining that there is a predetermined relationship between the code signal from the mobile device 2 and the code signal from the Flash memory 6, the CPU 3 sends the transmitter 7 a signal (hereinafter called an encrypted personal data reading signal) to read out the encrypted personal data mentioned previously. The encrypted personal data from the mobile device 2 demodulated in the receiver 8 is sent to the CPU 3, which decrypts the encrypted personal data using the decryption program stored in the Flash memory 6. If determining that the decrypted personal data matches the personal data from the Flash memory 6, the CPU 3 sends the transmitter 7 a signal (hereinafter called an input confirmation signal) to confirm which door(s) of the vehicle is to be unlocked (e.g., all doors or the driver side door). An input signal corresponding to the input confirmation signal from the mobile device 2 demodulated in the receiver 8 is sent to the CPU 3. The CPU 3 sends a controller (not shown) separately provided in the vehicle an instruction signal to unlock the door(s) of the vehicle on the basis of the input signal from the mobile device 2 demodulated in the receiver 8. Also, The CPU 3 sends the transmitter 7 a signal (hereinafter called an intra-area confirmation signal A) to determine whether the mobile device 2 is within the communication-feasible range. At this time, the CPU 3 resets the timer 5 to start measuring time. The CPU 3 checks whether a signal (hereinafter called an intra-area confirmation signal B) corresponding to the intra-area confirmation signal A is transmitted from the mobile device 2 thereto within a predetermined time period (t1 in FIG. 4). If determining that the intra-area confirmation signal B has not been transmitted from the mobile device 2 within the predetermined time period, the CPU 3 sends an instruction signal to lock the door(s) of the vehicle to the controller. Note that these functions of the CPU 3 are realized by the CPU 3 executing the program that is the result of decoding the program code read out from the Flash memory 6. The CPU 3 has an address counter (not shown) designating an address in the Flash memory 6, a program logic array (not shown) decoding program code read out from the Flash memory 6, an operation logic unit (not shown) performing logic operations, registers (not shown) temporarily storing operation data and the like.

The mobile device 2 comprises a CPU 11, an input unit 12, a Flash memory 13, a demodulator 24, a modulator 25, a receive antenna 18, a transmit antenna 19, inverters 20, 21, 22, a flag 23, and a timer 27.

The receive antenna 18 receives ASK-modulated signals from the vehicle-mounted device 1.

The demodulator 24 comprises, for example, an RF (Radio Frequency) 16 and a DET (detector) 14, and demodulates the ASK-modulated signals from the receive antenna 18.

The modulator 25 comprises, for example, an RF 17 and a modulating unit 15. The modulator 25 FSK-modulates signals from the CPU 11 with a carrier wave of 312 MHz in frequency. Also, if the inverter 201 is in an operational state according to an instruction from the CPU 11, the modulator 25 FSK-modulates signals from the demodulator 24 with the carrier wave of 312 MHz in frequency.

The transmit antenna 19 transmits the FSK-modulated signals by the modulator 25.

The CPU 11 is provided to control the mobile device 2 overall. Program code for the CPU 11 performing processes described later is stored beforehand in the Flash memory 13. Also stored in the Flash memory 13 is a code signal, which is to be sent to the vehicle-mounted device 1 according to the code reading signal from the vehicle-mounted device 1. Yet further, stored beforehand in the Flash memory 13 is encrypted personal data, which is to be sent to the vehicle-mounted device 1 according to the encrypted personal data reading signal from the vehicle-mounted device 1. The Flash memory 13 is constituted by a non-volatile memory, where data is electrically erasable and can be repeatedly written and read out.

The timer 27 measures time according to an instruction from the CPU 11.

An instruction signal on the basis of an instruction input from the person who carries the mobile device 2 (hereinafter called a wearer) is input to the input unit 12. If the wearer wants to unlock the driver side door, the wearer inputs an instruction to unlock the driver side door, and an instruction signal on the basis of the instruction input is input to the input unit 12. When the instruction signal to unlock the driver side door is input thereto, the input unit 12 stores one logic value of, e.g., "1" in the flag 23. In contrast, if the wearer wants to unlock all doors of the vehicle, the wearer inputs an instruction to unlock all doors of the vehicle, and an instruction signal on the basis of the instruction input is input to the input unit 12. When the instruction signal to unlock all the doors is input thereto, the input unit 12 stores the other logic value of, e.g., "0" in the flag 23. In the present implementation, for example, a switch (not shown) being provided in the key, if the wearer wants to unlock the driver side door, the switch is switched to one side, and if wanting to unlock all doors of the vehicle, the switch is switched to the other side. In the description below, it is supposed that by switching the switch to the one side, the instruction signal to unlock only the driver side door is input to the input unit 12, which then stores "1" in the flag 23 and by switching the switch to the other side, the instruction signal to unlock all the doors is input to the input unit 12, which then stores "0" in the flag 23.

The intra-area confirmation signal A from the vehicle-mounted device 1 demodulated by the demodulator 24 is sent to the CPU 11, which then sends the intra-area confirmation signal B to the modulator 25. At this time, the CPU 11 resets the timer 27 to start measuring time. The CPU 11 checks whether the intra-area confirmation signal A is transmitted again from the vehicle-mounted device 1 within a predetermined time period (t2 in FIG. 4). If determining that the intra-area confirmation signal A has not been transmitted within the predetermined time, the CPU 11 puts the inverter 21 in an operational state. Thus, signals from the vehicle-mounted device 1 demodulated by the demodulator 24 are FSK-modulated by the modulator 25 without being otherwise processed and are transmitted via the transmit antenna 19. The identifying signal from the vehicle-mounted device 1 demodulated by the demodulator 24 is sent to the CPU 11. When determining that the identifying signal has been received, the CPU 11 puts the inverter 21 in the non-operational state. The code reading signal from the vehicle-mounted device 1 demodulated by the demodulator 24 is sent to the CPU 11, and when determining that the code reading signal has been received, the CPU 11 reads out the code signal from the Flash memory 13 and sends to the modulator 25. The encrypted personal data reading signal from the vehicle-mounted device 1 demodulated by the demodulator 24 is sent to the CPU 11, and when determining that the personal data reading signal has been received, the CPU 11 reads out the encrypted personal data from the Flash memory 13 and sends to the modulator 25. The input confirmation signal from the vehicle-mounted device 1 demodulated by the demodulator 24 is sent to the CPU 11, and according to the input confirmation signal, the CPU 11 sends information of "1" or "0" stored in the flag 23 to the modulator 25. Note that these functions of the CPU 11 are realized by the CPU 11 executing the program that is the result of decoding the program code read out from the Flash memory 13. The CPU 11 has an address counter (not shown) designating an address in the Flash memory 13, a program logic array (not shown) decoding program code read out from the Flash memory 13, an operation logic unit (not shown) performing logic operations, registers (not shown) temporarily storing operation data and the like.

=Operation of Distance Calculation System (with no Relay Attack)=

Figure 3:
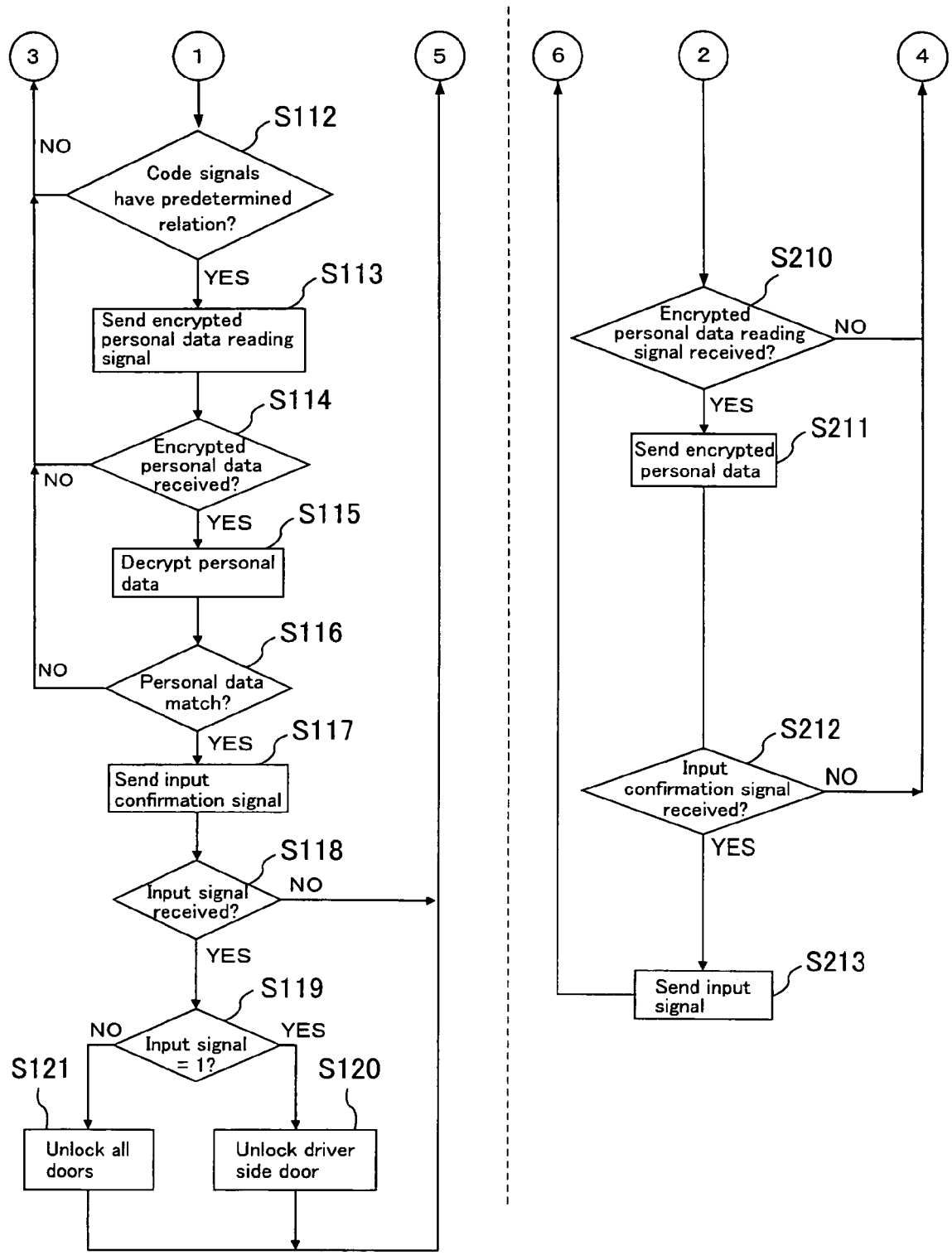
FIG. 3 is a flow chart showing the example of the operation of the distance calculation system according to the present invention.
Figure 4:
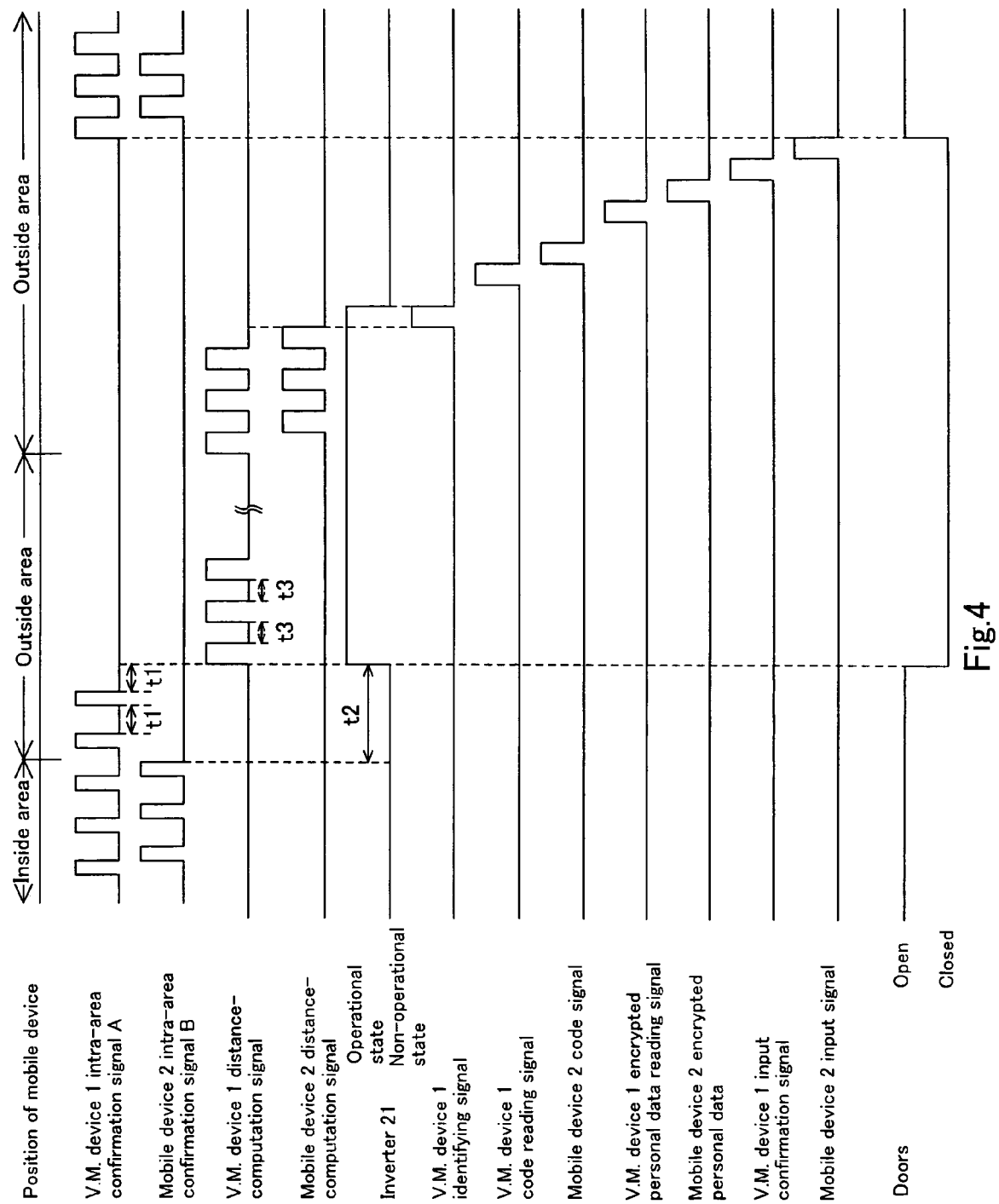
FIG. 4 is a timing chart showing the example of the operation of the distance calculation system according to the present invention.
Figure 5:
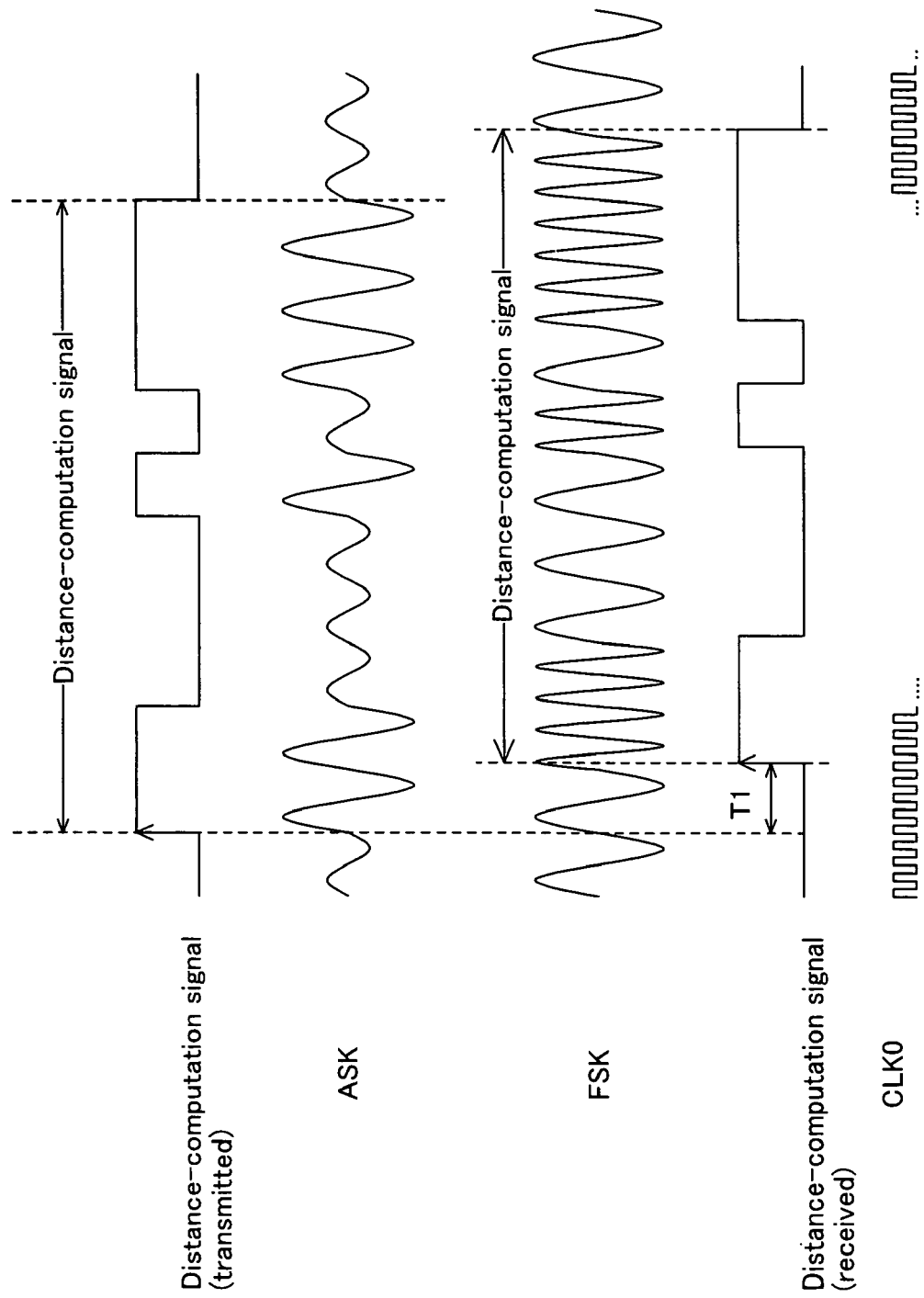
FIG. 5 is a diagram showing a change of a distance-calculation signal.

The operation of the distance calculation system of the invention will be described with reference to FIGS. 1 to 5. FIGS. 2 and 3 are a flow chart showing an example of the operation of the distance calculation system of the invention. FIG. 4 is a timing chart showing an example of the operation of the distance calculation system of the invention. FIG. 5 is a diagram showing a change of the distance-calculation signal. Note that in FIG. 4, signals labeled on the left being at a high level means that the signal is transmitted. In practice, signals transmitted from the vehicle-mounted device 1 to the mobile device 2 are signals ASK-modulated by the transmitter 7, and signals transmitted from the mobile device 2 to the vehicle-mounted device 1 are signals FSK-modulated by the modulator 25. One high level pulse of the vehicle-mounted device 1 distance-calculation signal in FIG. 4 represents the waveform of the distance-calculation signal (transmitted) in FIG. 5 for convenience of drawing. Moreover, in FIG. 4, all signals (e.g., a mobile device 2 code signal) are represented by rectangular waves for convenience of drawing, but not being limited to this, for example, the mobile device 2 code signal may be a code signal having code information whose length corresponds to the high level period. By this means, code information can be transmitted more effectively.

In this implementation, description starts from the scene where the wearer has stopped the vehicle engine and gone outside the vehicle carrying the mobile device 2 and shut the door. It is supposed that the inverter 21 of the mobile device 2 is in the non-operational state.

The controller (not shown) separately provided in the vehicle receives a signal indicating that the doors of the vehicle have been shut, and on the basis of this signal, sends a signal to start the passive keyless entry system to the CPU 3. Having received the signal to start the passive keyless entry system, the CPU 3 sends the intra-area confirmation signal A to the transmitter 7 (S101). At this time, the CPU 3 resets the timer 5 to start measuring time. Then, the CPU 3 checks whether the intra-area confirmation signal B from the mobile device 2 demodulated by the receiver 8 is received within the predetermined time period (t1) (S102). The transmitter 7 ASK-modulates the intra-area confirmation signal A with the carrier wave of 125 kHz in frequency. Then, the ASK-modulated intra-area confirmation signal A from the transmitter 7 is transmitted via the transmit antenna 9 (vehicle-mounted device 1 intra-area confirmation signal A in FIG. 4).

When the receive antenna 18 of the mobile device 2 receives the ASK-modulated intra-area confirmation signal A, the demodulator 24 demodulates the ASK-modulated intra-area confirmation signal A. Then, when determining that the intra-area confirmation signal A demodulated by the demodulator 24 has been received (YES in S201), the CPU 11 sends the intra-area confirmation signal B to the modulator 25 (S202). At this time, the CPU 11 resets the timer 27 to start measuring time. The CPU 11 checks whether the intra-area confirmation signal A is transmitted again from the vehicle-mounted device 1 within the predetermined time period (t2) (S201). The modulator 25 FSK-modulates the intra-area confirmation signal B with the carrier wave of 312 MHz in frequency. The intra-area confirmation signal B FSK-modulated in the modulator 25 is transmitted via the transmit antenna 19 (mobile device 2 intra-area confirmation signal B in FIG. 4).

The receive antenna 10 of the vehicle-mounted device 1 receives the FSK-modulated intra-area confirmation signal B, and the receiver 8 demodulates the FSK-modulated intra-area confirmation signal B. When determining that the intra-area confirmation signal B from the mobile device 2 demodulated by the receiver 8 has been received (YES in S102), the CPU 3 sends the intra-area confirmation signal A to the transmitter 7 again (S101).

As described above, if the wearer is within the range in which the mobile device 2 can receive the intra-area confirmation signal A from the vehicle-mounted device 1, the vehicle-mounted device 1 can receive the intra-area confirmation signal B from the mobile device 2 (intra-area in FIG. 4). Hence, the vehicle-mounted device 1 can determine whether the wearer is in its proximity (i.e., the communication-feasible range).

Next, the case where the wearer has gone outside the communication-feasible range (outside-area in FIG. 4) will be described.

If the wearer has gone outside the communication-feasible range, the mobile device 2 cannot receive the intra-area confirmation signal A from the vehicle-mounted device 1, thus not transmitting the intra-area confirmation signal B to the vehicle-mounted device 1. If determining that the intra-area confirmation signal B has not been sent from the mobile device 2 within the predetermined time period (t1) of transmitting the intra-area confirmation signal A (NO in S102), the CPU 3 sends an instruction signal to lock all doors of the vehicle to the controller (S103; doors being closed in FIG. 4). Here, the CPU 3 may be set to send the intra-area confirmation signal A to the transmitter 7 several times (e.g., twice) (see FIG. 4), and send an instruction signal to lock all doors of the vehicle to the controller when, for all of the several times of the transmission of the intra-area confirmation signal A, the CPU 3 determines that the mobile device 2 has not transmitted the intra-area confirmation signal B. By this means, the CPU 3 can determine more reliably that the wearer is not within the communication-feasible range. Also, where, soon after having gone outside the communication-feasible range, the wearer has returned into the communication-feasible range, it can be avoided to execute the process of locking the doors. Thus, the time required for the process of unlocking the doors is not needed, and a delay of the time required for the process until the doors are unlocked can be avoided. Then, if determining that the intra-area confirmation signal B has not been transmitted from the mobile device 2 within the predetermined time period of transmitting the intra-area confirmation signal A (NO in S102), the CPU 3 sends the distance-calculation signal (distance-calculation signal (transmitted) in FIG. 5) to the transmitter 7 (S104). At this time, the CPU 3 resets the counter 4 to start counting from the rising edge of the distance-calculation signal. Also, the CPU 3 resets the timer 5 to start measuring time. Then, the CPU 3 checks whether the distance-calculation signal is returned from the mobile device 2 within a predetermined time period (t3) (S105). The transmitter 7 ASK-modulates the distance-calculation signal with the carrier wave of 125 kHz in frequency (ASK in FIG. 5). Then, the ASK-modulated distance-calculation signal from the transmitter 7 is transmitted via the transmit antenna 9 (vehicle-mounted device 1 distance-calculation signal in FIG. 4). Here, if determining that the distance-calculation signal demodulated by the receiver 8 has not been received within the predetermined time period (t3) of transmitting the distance-calculation signal, the CPU 3 transmits the distance-calculation signal again, and resets the timer 5 to start measuring time and resets the counter 4 to start counting. Note that the distance-calculation signal is not limited in waveform to that of FIG. 5, but that, for higher security, the distance-calculation signal may have a different content or waveform each time it is sent from the CPU 3 or in each predetermined time period.

As described above, if the wearer has gone outside the range in which the intra-area confirmation signal A from the vehicle-mounted device 1 can be received, all doors of the vehicle are locked.

When determining that the intra-area confirmation signal A is not received within the predetermined time period (t2), the CPU 11 puts the inverter 21 in the operational state (S203; inverter 21 in FIG. 4).

Next, the case where the wearer has returned into the communication-feasible range (intra-area on the right side of FIG. 4) will be described.

When the wearer has returned into the communication-feasible range, the receive antenna 18 of the mobile device 2 receives the ASK-modulated distance-calculation signal from the vehicle-mounted device 1. The demodulator 24 demodulates the ASK-modulated distance-calculation signal. Here, the distance-calculation signal from the vehicle-mounted device 1 demodulated by the demodulator 24 is sent as it is to the modulator 25 because the inverter 21 is in the operational state (S205). The modulator 25 FSK-modulates the distance-calculation signal with the carrier wave of 312 MHz in frequency (FSK in FIG. 5). The distance-calculation signal FSK-modulated in the modulator 25 is transmitted via the transmit antenna 19 (mobile device 2 distance-calculation signal in FIG. 4).

The receive antenna 10 of the vehicle-mounted device 1 receives the FSK-modulated distance-calculation signal, and the receiver 8 demodulates the FSK-modulated distance-calculation signal (distance-calculation signal (received) in FIG. 5). When determining that the distance-calculation signal from the mobile device 2 demodulated by the receiver 8 has been received (YES in S105), the CPU 3 reads out the count of the counter 4, and based on the count, calculates the distance from the vehicle-mounted device 1 to the mobile device 2 (S106). As described previously, for the communication from the vehicle-mounted device 1 to the mobile device 2, the low frequency carrier wave of 125 kHz is used, and for the communication from the mobile device 2 to the vehicle-mounted device 1, the high frequency carrier wave of 312 MHz is used, and hence, the phase difference in the communication from the mobile device 2 to the vehicle-mounted device 1 is negligible compared with the phase difference produced in the communication from the vehicle-mounted device 1 to the mobile device 2. There occurs a phase difference T1 (FIG. 5) between the distance-calculation signal sent from the CPU 3 to the transmitter 7 and the distance-calculation signal demodulated by the receiver 8 since using the low frequency of 125 kHz. Hence, the count read out by the CPU 3 indicates the phase difference T1. Then, the CPU 3 reads out the distance corresponding to the count obtained through experiment and stored as tabular data in the Flash memory 6. Hence, the distance from the vehicle-mounted device 1 to the mobile device 2 can be calculated using the count indicating the phase difference T1. The CPU 3 determines whether the mobile device 2 is within a predetermined distance (e.g., 1 meter) of the vehicle-mounted device 1 (S108). In the implementation, it is checked whether the distance from the vehicle-mounted device 1 to the mobile device 2 obtained from the count of the counter 4 is below the predetermined distance, but the invention is not limited to this. For example, the CPU 3 may start the timer 5 measuring when sending the distance-calculation signal to the transmitter 7 and read out the time measured by the timer 5 when the distance-calculation signal from the mobile device 2 demodulated in the receiver 8 is received, and check whether the distance from the vehicle-mounted device 1 to the mobile device 2 is below the predetermined distance, by using the time measured by the timer 5. Furthermore, the number of times when the CPU 3 determines the distance from the vehicle-mounted device 1 to the mobile device 2 is not limited to one, but a number of times (three times in FIG. 4), the CPU 3 may determine the distance from the vehicle-mounted device 1 to the mobile device 2 and if all of the times it is determined that the distance is below the predetermined distance, proceed to the next process. By this means, the distance from the vehicle-mounted device 1 to the mobile device 2 can be determined more reliably. If determining that the distance from the vehicle-mounted device 1 to the mobile device 2 is below the predetermined distance (YES in S108), the CPU 3 sends the identifying signal to the transmitter 7 (S109). The transmitter 7 ASK-modulates the identifying signal with the carrier wave of 125 kHz in frequency. Then, the ASK-modulated identifying signal from the transmitter 7 is transmitted via the transmit antenna 9 (vehicle-mounted device 1 identifying signal in FIG. 4).

The receive antenna 18 of the mobile device 2 receives the ASK-modulated identifying signal and the demodulator 24 demodulates the ASK-modulated identifying signal. When determining that the identifying signal demodulated by the demodulator 24 has been received (YES in S206), the CPU 11 puts the inverter 21 in the non-operational state (S207; inverter 21 in FIG. 4). Next, the CPU 3 of the vehicle-mounted device 1 sends the code reading signal to the transmitter 7 (S110). Then, the CPU 3 checks whether the code signal from the mobile device 2 demodulated by the receiver 8 is received (S111). The transmitter 7 ASK-modulates the code reading signal with the carrier wave of 125 kHz in frequency. Then, the ASK-modulated code reading signal from the transmitter 7 is transmitted via the transmit antenna 9 (vehicle-mounted device 1 code reading signal in FIG. 4).

The receive antenna 18 of the mobile device 2 receives the ASK-modulated code reading signal and the demodulator 24 demodulates the ASK-modulated code reading signal. When determining that the code reading signal demodulated by the demodulator 24 has been received (YES in S208), the CPU 11 reads out the code signal from the Flash memory 13 and sends to the modulator 25 (S209). The modulator 25 FSK-modulates the code signal with the carrier wave of 312 MHz in frequency. The code signal FSK-modulated in the modulator 25 is transmitted via the transmit antenna 19 (mobile device 2 code signal in FIG. 4).

The receive antenna 10 of the vehicle-mounted device 1 receives the FSK-modulated code signal, and the receiver 8 demodulates the FSK-modulated code signal. When determining that the code signal from the mobile device 2 demodulated by the receiver 8 has been received (YES in S111), the CPU 3 reads out the code signal from the Flash memory 6 to verify with the code signal from the mobile device 2. Then, the CPU 3 checks whether there is a predetermined relationship between the code signal from the mobile device 2 and the code signal from the Flash memory 6 (S112). If determining that there is the predetermined relationship between the code signal from the mobile device 2 and the code signal from the Flash memory 6 (YES in S112), the CPU 3 sends the encrypted personal data reading signal to the transmitter 7 (S113). Then, the CPU 3 checks whether the encrypted personal data from the mobile device 2 demodulated by the receiver 8 is received (S114). The transmitter 7 ASK-modulates the encrypted personal data reading signal with the carrier wave of 125 kHz in frequency. Then, the ASK-modulated encrypted personal data reading signal from the transmitter 7 is transmitted via the transmit antenna 9 (vehicle-mounted device 1 encrypted personal data reading signal in FIG. 4).

The receive antenna 18 of the mobile device 2 receives the ASK-modulated encrypted personal data reading signal and the demodulator 24 demodulates the ASK-modulated encrypted personal data reading signal. When determining that the encrypted personal data reading signal demodulated by the demodulator 24 has been received (YES in S210), the CPU 11 reads out the encrypted personal data from the Flash memory 13 and sends to the modulator 25 (S211). The modulator 25 FSK-modulates the encrypted personal data with the carrier wave of 312 MHz in frequency. The encrypted personal data FSK-modulated in the modulator 25 is transmitted via the transmit antenna 19 (mobile device 2 encrypted personal data in FIG. 4).

The receive antenna 10 of the vehicle-mounted device 1 receives the FSK-modulated encrypted personal data, and the receiver 8 demodulates the FSK-modulated encrypted personal data. When determining that the encrypted personal data from the mobile device 2 demodulated by the receiver 8 has been received (YES in S114), the CPU 3 decrypts the encrypted personal data according to the decryption program stored in the Flash memory 6 (S115). After decrypting the encrypted personal data from the mobile device 2 (hereinafter the decrypted encrypted personal data being called decrypted personal data), the CPU 3 reads out the personal data stored in the Flash memory 6, and checks whether the decrypted personal data and the personal data from the Flash memory 6 match (S116). If determining that the decrypted personal data and the personal data from the Flash memory 6 match (YES in S116), the CPU 3 sends the input confirmation signal to the transmitter 7 (S117). Then, the CPU 3 checks whether the input signal from the mobile device 2 demodulated by the receiver 8 is received (S118). The transmitter 7 ASK-modulates the input confirmation signal with the carrier wave of 125 kHz in frequency. Then, the ASK-modulated input confirmation signal from the transmitter 7 is transmitted via the transmit antenna 9 (vehicle-mounted device 1 input confirmation signal in FIG. 4).

The receive antenna 18 of the mobile device 2 receives the ASK-modulated input confirmation signal and the demodulator 24 demodulates the ASK-modulated input confirmation signal. When determining that the input confirmation signal demodulated by the demodulator 24 has been received (YES in S212), the CPU 11 reads out information stored in the flag 23. The information stored in the flag 23, as described above, is "1" in the case where the wearer wants to unlock the driver side door and inputs an instruction to that effect to the input unit 12, by switching the switch to the one side, which stores "1" in the flag 23 on the basis of the instruction, and "0" in the case where the wearer wants to unlock all doors of the vehicle and inputs an instruction to that effect to the input unit 12, by switching the switch to the other side, which stores "0" in the flag 23 on the basis of the instruction. In the implementation, description will be made below supposing that "1" is stored in the flag 23. The CPU 11 sends an input signal corresponding to the "1" stored in the flag 23 to the modulator 25 (S213). The modulator 25 FSK-modulates the input signal from the CPU 11 with the carrier wave of 312 MHz in frequency. The input signal FSK-modulated in the modulator 25 is transmitted via the transmit antenna 19 (mobile device 2 input signal in FIG. 4).

The receive antenna 10 of the vehicle-mounted device 1 receives the FSK-modulated input signal, and the receiver 8 demodulates the FSK-modulated input signal. When determining that the input signal from the mobile device 2 demodulated by the receiver 8 has been received (YES in S118), the CPU 3 checks whether the input signal is corresponding to "1" (S119). If determining that the input signal is corresponding to "1" (YES in S119), the CPU 3 sends an instruction signal to unlock only the driver side door to the controller (not shown) (S120). If determining that the input signal is not corresponding to "1" (NO in S119), the CPU 3 sends an instruction signal to unlock all doors of the vehicle to the controller (S121).

As described above, if the mobile device 2 is within the communication-feasible range, and the distance from the vehicle-mounted device 1 to the mobile device 2, which is calculated from the distance-calculation signal sent by the CPU 3 to the transmitter 7 and the distance-calculation signal from the mobile device 2 demodulated by the receiver 8, is determined to be below the predetermined distance, the controller unlocks all doors or the driver side door of the vehicle.

=Operation of Distance Calculation System (with a Relay Attack)=

Figure 6:
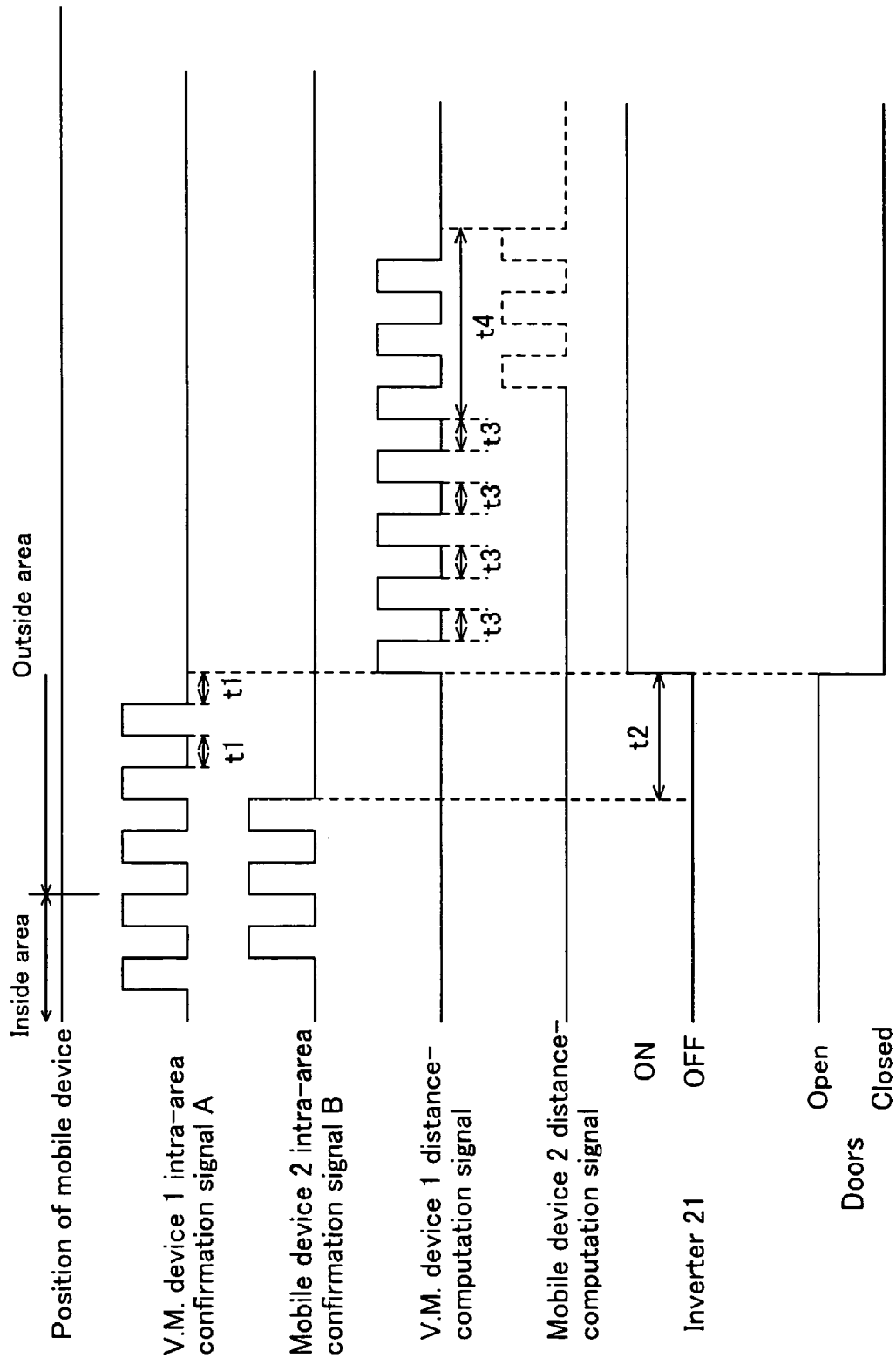
FIG. 6 is a timing chart showing another example of the operation of the distance calculation system according to the present invention.
Figure 7:
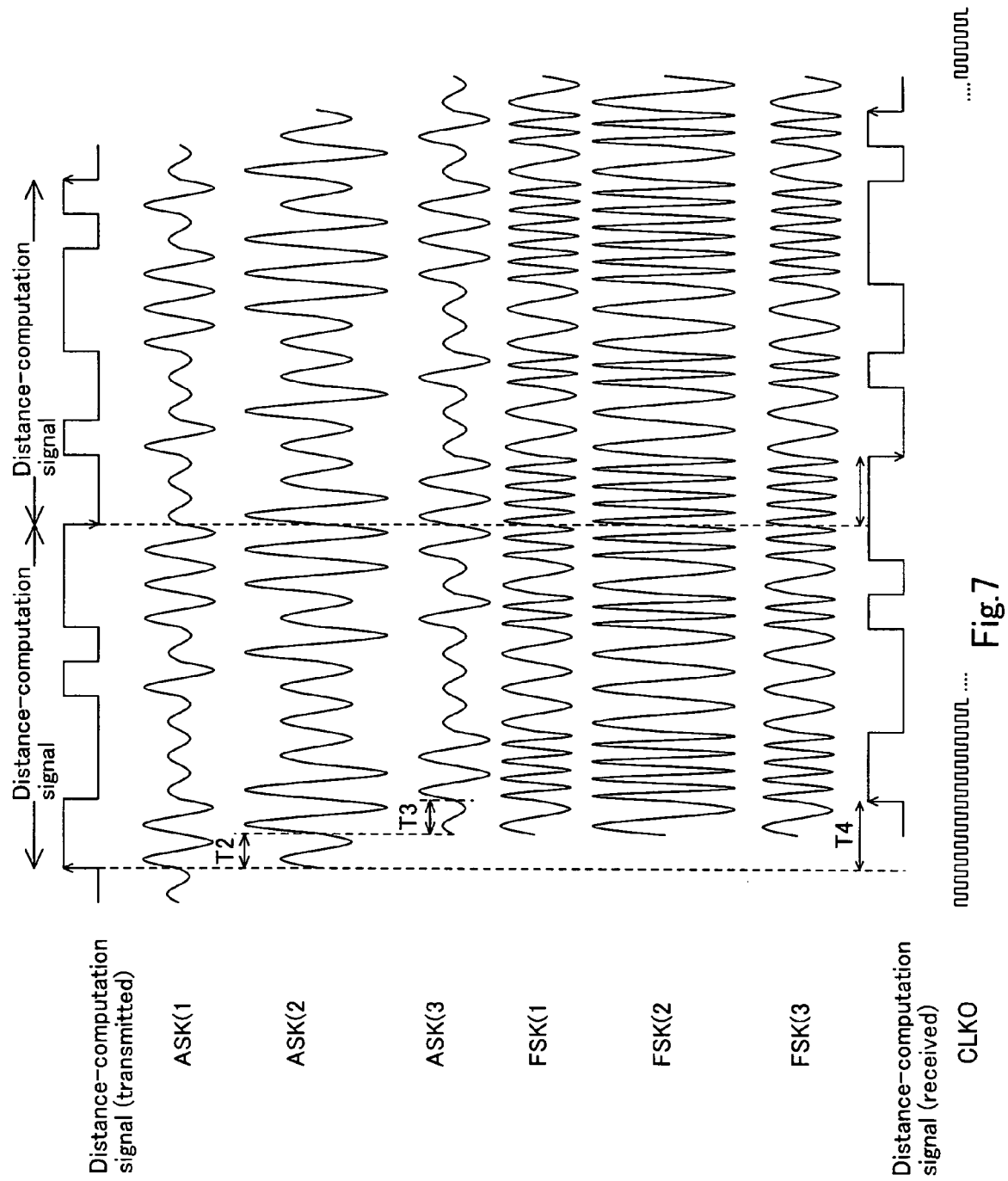
FIG. 7 is a diagram showing a change of the distance-calculation signal.

The operation of the distance calculation system having a relay attack made thereon of the invention will be described with reference to FIGS. 1 to 3, 6 and 7. FIG. 6 is a timing chart showing another example of the operation of the distance calculation system of the invention. FIG. 7 is a diagram showing a change of the distance-calculation signal. Note that in FIG. 6, signals labeled on the left being at a high level means that the signal is transmitted like in FIG. 4. In practice, signals transmitted from the vehicle-mounted device 1 to the mobile device 2 are signals ASK-modulated by the transmitter 7, and signals transmitted from the mobile device 2 to the vehicle-mounted device 1 are signals FSK-modulated by the modulator 25. One high level pulse of the vehicle-mounted device 1 distance-calculation signal in FIG. 6 represents the waveform of the distance-calculation signal (transmitted) in FIG. 7 for convenience of drawing.

Also in this implementation, description starts from the scene where the wearer has stopped the vehicle engine and gone outside the vehicle carrying the mobile device 2 and shut the door. It is supposed that the inverter 21 of the mobile device 2 is in the non-operational state.

Furthermore, in the description below of this implementation, a relay attack is made by the person (hereinafter called an intermediary X) who carries a relay A (not shown) within the communication area of the vehicle-mounted device 1 and the person (hereinafter called an intermediary Y) who carries a relay B (not shown) able to communicate with the relay A within the communication area of the mobile device 2.

When the wearer is within the communication-feasible range, the operation is the same as in the above case of having no relay attack.

If the wearer has gone outside the communication-feasible range, the mobile device 2 cannot receive the intra-area confirmation signal A from the vehicle-mounted device 1, thus not transmitting the intra-area confirmation signal B to the vehicle-mounted device 1. The CPU 3 determines that the intra-area confirmation signal B has not been transmitted from the mobile device 2 within the predetermined time period (t1) of transmitting the intra-area confirmation signal A (NO in S102). And the CPU 3 sends an instruction signal to lock all doors of the vehicle to the controller (not shown) separately provided in the vehicle (S103; doors being closed in FIG. 6). Here, the CPU 3 may be set to send the intra-area confirmation signal A to the transmitter 7 several times (e.g., twice) (see FIG. 6) as mentioned in the case of having no relay attack. The CPU 3 sends the instruction signal to the controller and the distance-calculation signal (distance-calculation signal (transmitted) in FIG. 7) to the transmitter 7. At this time, the CPU 3 resets the counter 4 to start counting from the rising edge of the distance-calculation signal. Also, the CPU 3 resets the timer 5 to start measuring time. Then, the CPU 3 checks whether the distance-calculation signal is returned from the mobile device 2 within the predetermined time period (t3) (S105). The transmitter 7 ASK-modulates the distance-calculation signal with the carrier wave of 125 kHz in frequency (ASK(1) in FIG. 7). Then, the ASK-modulated distance-calculation signal ASK(l) from the transmitter 7 is transmitted via the transmit antenna 9 (vehicle-mounted device 1 distance-calculation signal in FIG. 6). Here, if determining that the distance-calculation signal demodulated by the receiver 8 has not been received within the predetermined time period (t3) of transmitting the distance-calculation signal, the CPU 3 transmits the distance-calculation signal again, and resets the timer 5 to start measuring time and resets the counter 4 to start counting.

In this way, if the wearer has gone outside the range in which the intra-area confirmation signal A from the vehicle-mounted device 1 can be received, all doors of the vehicle are locked.

When determining that the intra-area confirmation signal A is not received within the predetermined time period (t2), the CPU 11 puts the inverter 21 in the operational state (S203; inverter 21 in FIG. 6).

For example, when the wearer has gone outside the communication-feasible range and moved so far away as not to see the vehicle, the intermediary X comes close to the vehicle with the relay A entering the communication area of the vehicle-mounted device 1, and the intermediary Y comes close to the-wearer with the relay B entering the communication area of the mobile device 2 in an attempt to steal the vehicle (a relay attack).

The relay A within the communication area of the vehicle-mounted device 1 receives the distance-calculation signal from the vehicle-mounted device 1 and detects and amplifies this signal (ASK(2) in FIG. 7). Then, the relay A transmits a distance-calculation signal ASK(2). The communication distance of the distance-calculation signal ASK(2) transmitted by the relay A is such that the signal covers a greater distance than t he distance-calculation signal ASK(1) from the vehicle-mounted device 1 does since being amplified by the relay A. Description will be made below supposing that the communication distance of the distance-calculation signal ASK(2) is such that the relay B can receive this signal.

When receiving the distance-calculation signal ASK(2) from the relay A, the relay B detects and attenuates the distance-calculation signal ASK(2) to, e.g., the level of the distance-calculation signal transmitted by the vehicle-mounted device 1, and transmits an attenuated distance-calculation signal ASK(3).

At this time, since the intermediary Y is near the wearer, the relay B is within the communication area of the mobile device 2, and the receive antenna 18 receives the distance-calculation signal ASK(3). The demodulator 24 demodulates the distance-calculation signal ASK(3). Here, the distance-calculation signal from the relay B demodulated by the demodulator 24 is sent as it is to the modulator 25 because the inverter 21 is in the operational state (S205). The modulator 25 FSK-modulates the distance-calculation signal from the demodulator 24 with the carrier wave of 312 MHz in frequency (FSK(1) in FIG. 5). The distance-calculation signal FSK(1) FSK-modulated in the modulator 25 is transmitted via the transmit antenna 19 (mobile device 2 distance-calculation signal in FIG. 6).

And since the relay B is within the communication area of the mobile device 2, the relay B receives the FSK-modulated distance-calculation signal FSK(1) from the mobile device 2. The relay B detects and amplifies the FSK-modulated distance-calculation signal FSK(1) (FSK(2) in FIG. 7), and transmits a distance-calculation signal FSK(2). The communication distance of the distance-calculation signal FSK(2) transmitted from the relay B is such that the signal covers a greater distance than the distance-calculation signal FSK(1) from the mobile device 2 does since being amplified by the relay B. Description will be made below supposing that the communication distance of the distance-calculation signal FSK(2) is such that the relay A can receive this signal.

When receiving the distance-calculation signal FSK(2) from the relay B, the relay A detects and attenuates the distance-calculation signal FSK(2) to, e.g., the level of the distance-calculation signal transmitted by the mobile device 2, and transmits an attenuated distance-calculation signal FSK (3).

At this time, since the intermediary X is near the vehicle, the relay A is within the communication area of the vehicle-mounted device 1, and the receive antenna 10 receives the distance-calculation signal FSK(3). The receiver 8 demodulates the distance-calculation signal FSK(3) (distance-calculation signal (received) in FIG. 7). When determining that the distance-calculation signal demodulated by the receiver 8 has been received (YES in S105), the CPU 3 reads out the count of the counter 4, and based on the count, calculates the distance from the vehicle-mounted device 1 to the mobile device 2 (S106).

Here, the method of calculating the distance from the vehicle-mounted device 1 to the mobile device 2 by the CPU 3 is the same as in the case of having no relay attack, but the relay A, as described previously, amplifies the distance-calculation signal ASK(1) transmitted from the vehicle-mounted device 1 and transmits the distance-calculation signal ASK (2). In order to amplify the distance-calculation signal ASK (1), the relay A first has to detect the distance-calculation signal ASK(1). In the communication from the vehicle-mounted device 1 to the mobile device 2, as described previously, signals are ASK-modulated with the low frequency carrier wave of 125 kHz, and hence, one period of the distance-calculation signal ASK(1) is longer than the distance-calculation signal FSK(1) transmitted from the mobile device 2. Because the relay A first detects and then amplifies the distance-calculation signal ASK(1), whose period is longer, a phase difference T2 occurs between the distance-calculation signals ASK(1) and ASK(2). Also in the attenuation by the relay B, a phase difference T3 occurs between the distance-calculation signals ASK(2) and ASK(3). That is, a phase difference T4 between the distance-calculation signal (transmitted) sent by the CPU 3 to the transmitter 7 and the distance-calculation signal (received) demodulated by the receiver 8 is given by T4=T2+T3. The count of the counter 4 read out by the CPU 3 indicates the phase difference T4. The CPU 3 calculates the distance from the vehicle-mounted device 1 to the mobile device 2 using the count indicating the phase difference T4. The count indicating the phase difference T4 used for calculating this distance is greater than the count indicating the phase difference T1 (FIG. 5) in the case where there are not the relays A and B and a relay attack. That is, the distance from the vehicle-mounted device 1 to the mobile device 2 calculated by the CPU 3 based on the count indicating the phase difference T4 is greater than the distance calculated based on the count indicating the phase difference T1.

And the CPU 3 determines whether the mobile device 2 is within a predetermined distance of the vehicle-mounted device 1 on the basis of the calculated distance (S108). The distance calculated by the CPU 3 is greater than the distance calculated where there is no relay attack. Hence, the CPU 3 determines that the mobile device 2 is not within the predetermined distance (NO in S108). Then, the CPU 3 determines whether the time measured by the timer 5 has reached a predetermined time period (t4) (S122).

If determining that the time has not reached the predetermined time period (t4) (NO in S122), the CPU 3 again sends the distance-calculation signal to the transmitter 7 (distance-calculation signal (transmitted) on the right side in FIG. 7). At this time, the CPU 3 resets the counter 4 to start counting from the rising edge of the distance-calculation signal. Note that the reason why the CPU 3 again sends the distance-calculation signal to the transmitter 7 is that it allows the distance from the vehicle-mounted device 1 to the. mobile device 2 to be calculated precisely. If determining that the time has reached the predetermined time period (t4) (YES in S122) without having determined that the mobile device 2 is within the predetermined distance (NO in S108), the CPU 3 stops communication with the mobile device 2 (S123). In this implementation, when the CPU 3 determines that the mobile device 2 is not within the predetermined distance, communication with the mobile device 2 is stopped, but this invention is not limited to this. For example, the mobile device 2 may be provided with an alarm (not shown) for sounding an alarm, and when determining that the mobile device 2 is not within the predetermined distance, the CPU 3 sends an alarm signal to the transmitter 7 for the alarm to sound an alarm, and according to the alarm signal transmitted to the mobile device 2 via the relays A and B, the alarm sounds an alarm. By this means, the wearer can become aware that the intermediaries X, Y are involved, and thus security is improved.

As such, if there is a relay attack, the phase difference of the distance-calculation signals becomes larger in the communication from the vehicle-mounted device 1 to the mobile device 2 since the intermediaries X, Y are involved. Hence, the CPU 3 determines that the mobile device 2 is not within the predetermined distance of the vehicle-mounted device 1, and when the predetermined time period (t4) is reached, communication with the mobile device 2 is stopped. The relay attack by the intermediaries X, Y cannot unlock the door(s) of the vehicle, and thus the theft of the vehicle can be prevented.

Even when the wearer has returned into the communication-feasible range, the door(s) is not unlocked because communication between the vehicle-mounted device 1 and the mobile device 2 is stopped. In this case, the wearer unlocks the door by inserting the key into the key hole. At this time, the controller (not shown) receives a signal indicating that the door has been unlocked by inserting the key into the key hole. On the basis of the signal, the controller sends the CPU 3 a communication start signal to start communication between the vehicle-mounted device 1 and the mobile device 2. When receiving the communication start signal (YES in S124), the CPU 3 starts communication with the mobile device 2 again.

<<Second Implementation<<

==Entire Configuration of Distance Calculation System==

Figure 8:
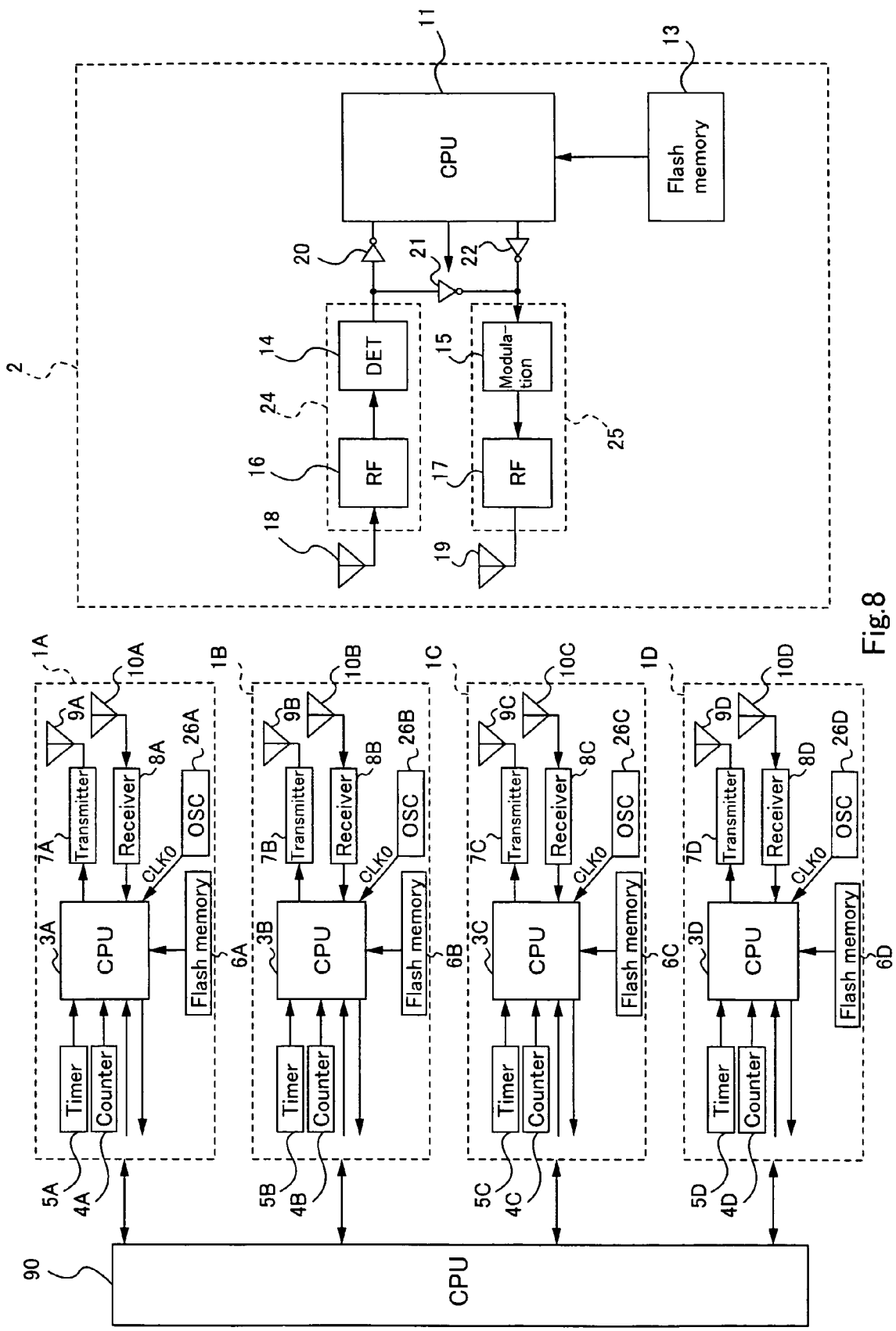
FIG. 8 is a block diagram showing another example of the whole configuration of the distance calculation system according to the present invention.
Figure 10:
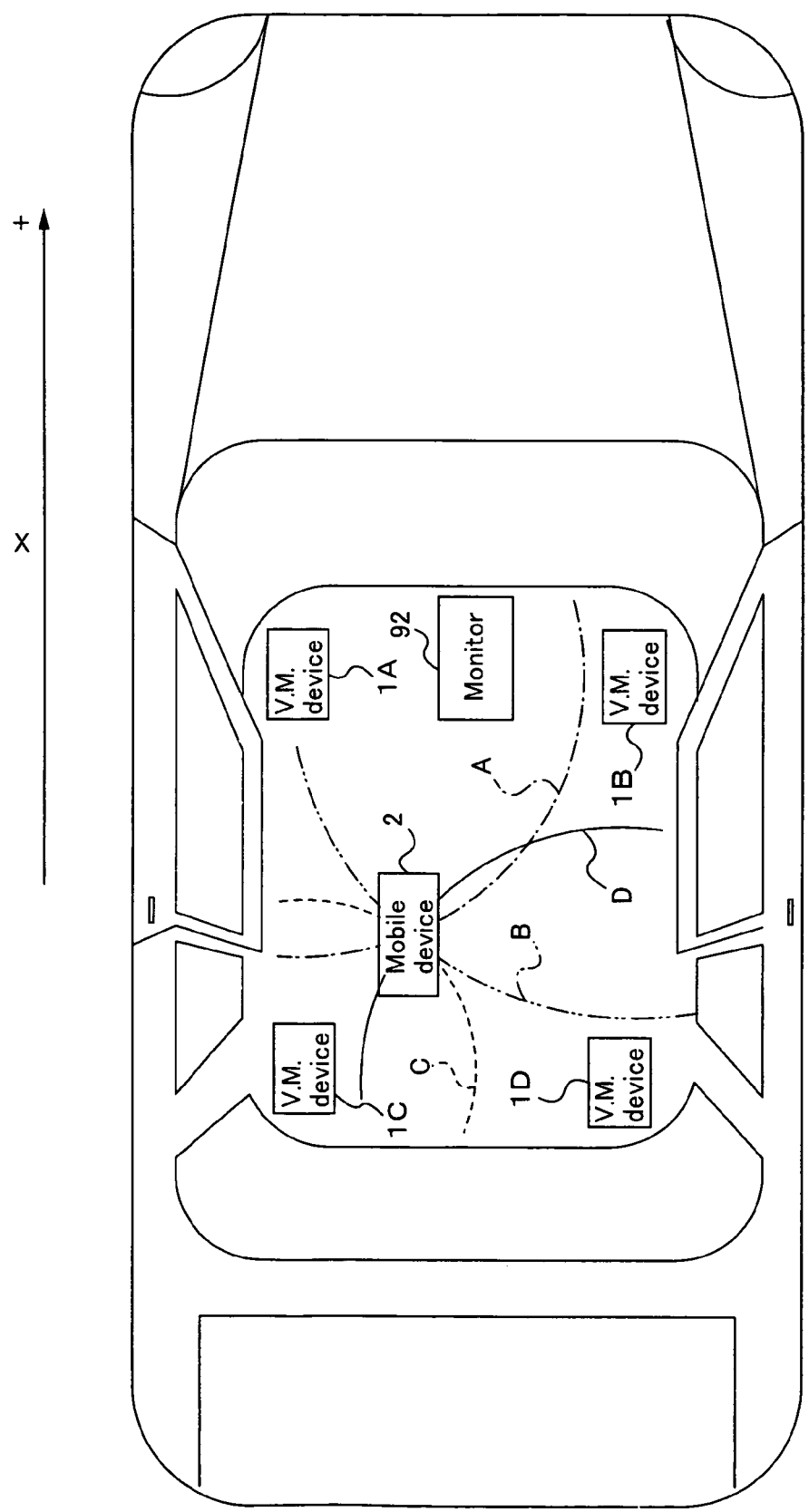
FIG. 10 shows how a mobile device 2 is detected with vehicle-mounted devices 1A, 1B, 1C, 1D.

The distance calculation system of the present invention will be described with reference to FIGS. 8, 10. FIG. 8 is a function block diagram showing an example of the entire configuration of the distance calculation system according to the present invention. In this implementation, description will be offered of the case where four of the vehicle-mounted device 1 of the first implementation (1A, 1B, 1C, 1D) are provided in a vehicle and where the mobile device 2 somewhere in the vehicle is detected by the distance calculation system. The distance calculation system comprises the vehicle-mounted devices 1A, 1B, 1C, 1D and the mobile device 2. In FIG. 8, the same reference numerals denote like parts as in FIG. 1 with description thereof being unwarranted, and the vehicle-mounted devices 1A, 1B, 1C, 1D are the same as the vehicle-mounted device 1 of FIG. 1 each having a suffix added thereto with description thereof being unwarranted. FIG. 10 shows how the mobile device 2 is detected with the vehicle-mounted devices 1A, 1B, 1C, 1D. In FIG. 10, the +X direction is in the forward direction of the vehicle, and the vehicle-mounted device 1A is provided on the front left side, the vehicle-mounted device 1B on the front right side, the vehicle-mounted device 1C on the back left side, and the vehicle-mounted device 1D on the back right side. Furthermore, a CPU 90 is provided inside the vehicle with the vehicle-mounted devices 1A, 1B, 1C, 1D. The mobile device 2 is provided in a key for the vehicle.

The CPU 90 controls the vehicle-mounted devices 1A, 1B, 1C, 1D overall.

The vehicle-mounted device 1A comprises a CPU 3A, a counter 4A, a timer 5A, a Flash memory 6A, a transmitter 7A, a receiver 8A, a transmit antenna 9A, a receive antenna 10A, and an OSC 26A.

The CPU 3A, according to an instruction signal from the CPU 90, sends the transmitter 7A a signal to confirm whether the mobile device 2 is inside the vehicle (hereinafter called an intra-vehicle confirmation signal A). The CPU 3A receives an intra-vehicle confirmation signal B from the mobile device 2 demodulated by the receiver 8A, and sends the CPU 90 a confirmation signal in response to the receipt of the intra-vehicle confirmation signal B. If not receiving the intra-vehicle confirmation signal B, the CPU 3A sends the CPU 90 a non-confirmation signal in response thereto. Moreover, according to an instruction signal from the CPU 90, the CPU 3A sends the transmitter 7A a signal to put the inverter 21 in the operational state (hereinafter called an instruct-the-inverter-to-operate signal) or a signal to put the inverter 21 in the non-operational state (hereinafter called an instruct-the-inverter-not-to-operate signal). The CPU 3A calculates the distance from the vehicle-mounted device 1A to the mobile device 2 based on the count of the counter 4A as in the first implementation, and sends the CPU 90 information about the distance from the vehicle-mounted device 1A to the mobile device 2.

The configuration of the vehicle-mounted devices 1B, 1C, 1D is the same as that of the vehicle-mounted device 1A. Note that the vehicle-mounted devices 1A, 1B, 1C, 1D may perform the above process simultaneously or separately according to instructions from the CPU 90.

The CPU 90, according to an instruction signal from a controller (not shown) provided in the vehicle, sends the vehicle-mounted devices 1A, 1B, 1C, 1D an instruction signal for the CPUs 3A, 3B, 3C, 3D to sends the intra-vehicle confirmation signal A, and in response to the confirmation signal from the vehicle-mounted devices 1A, 1B, 1C, 1D, sends the controller a signal to allow the engine of the vehicle to start (hereinafter called an engine start enable signal). The CPU 90, in response to the non-confirmation signal from the vehicle-mounted devices 1A, 1B, 1C, 1D, sends the controller a signal not to allow the engine of the vehicle to start (hereinafter called an engine start prohibit signal). The controller sends a signal to detect the mobile device 2 (hereinafter called a detection signal) to the CPU 90. The CPU 90, on the basis of the detection signal, sends the vehicle-mounted devices 1A, 1B, 1C, 1D an instruction signal for the CPUs 3A, 3B, 3C, 3D to send the instruct-the-inverter-to-operate signal, and sends the vehicle-mounted devices 1A, 1B, 1C, 1D an instruction signal for the CPUs 3A, 3B, 3C, 3D to calculate the distances from the vehicle-mounted devices 1A, 1B, 1C, 1D to the mobile device 2. Information about the distances from the vehicle-mounted devices 1A, 1B, 1C, 1D to the mobile device 2 calculated is sent to the CPU 90. Based on the information about the distances calculated by the CPUs 3A, 3B, 3C, 3D, the CPU 90 calculates where the mobile device 2 is located in the vehicle. In order to calculate the location of the mobile device 2, the CPU 90 reads out program code for calculating the location of the mobile device 2 from memory (not shown). Then, through the process of the program executed by the CPU 90, where the mobile device 2 is located is found as a point at which all the distances, represented by the distance information from the vehicle-mounted devices 1A, 1B, 1C, 1D, meet. For example, suppose that the distance to the mobile device 2 calculated by the vehicle-mounted device 1A is 120 centimeters, the distance to the mobile device 2 calculated by the vehicle-mounted device 1B is 212 cm, the distance to the mobile device 2 calculated by the vehicle-mounted device 1C is 20 cm, and the distance to the mobile device 2 calculated by the vehicle-mounted device 1D is 117 cm. The CPU 90 calculates the intersection point of the line of points to which the distance from the vehicle-mounted device 1A is 120 cm, the line of points to which the distance from the vehicle-mounted device 1B is 212 cm, the line of points to which the distance from the vehicle-mounted device 1C is 20 cm, and the line of points to which the distance from the vehicle-mounted device 1D is 117 cm. And the CPU 90 determines that the mobile device 2 is located at the intersection point.

The mobile device 2 comprises a CPU 11, a Flash memory 13, a demodulator 24, a modulator 25, a receive antenna 18, a transmit antenna 19, and inverters 20, 21, 22.

The CPU 11 receives the intra-vehicle confirmation signal A from the vehicle-mounted devices 1A, 1B, 1C, 1D demodulated by the demodulator 24, and on the basis of the intra-vehicle confirmation signal A, sends the intra-vehicle confirmation signal B to the modulator 25. The CPU 11 receives the instruct-the-inverter-to-operate signal from the vehicle-mounted devices 1A, 1B, 1C, 1D demodulated by the demodulator 24, and on the basis of the instruct-the-inverter-to-operate signal, puts the inverter in the operational state. Thus, signals from the vehicle-mounted devices 1A, 1B, 1C, 1D demodulated by the demodulator 24 are FSK-modulated by the modulator 25 without being otherwise processed and are transmitted via the transmit antenna 19. The CPU 11 receives the instruct-the-inverter-not-to-operate signal from the vehicle-mounted devices 1A, 1B, 1C, 1D demodulated by the demodulator 24, and according to the instruct-the-inverter-not-to-operate signal, puts the inverter 21 in the non-operational state.

==Operation of Distance Calculation System==

Figure 9:
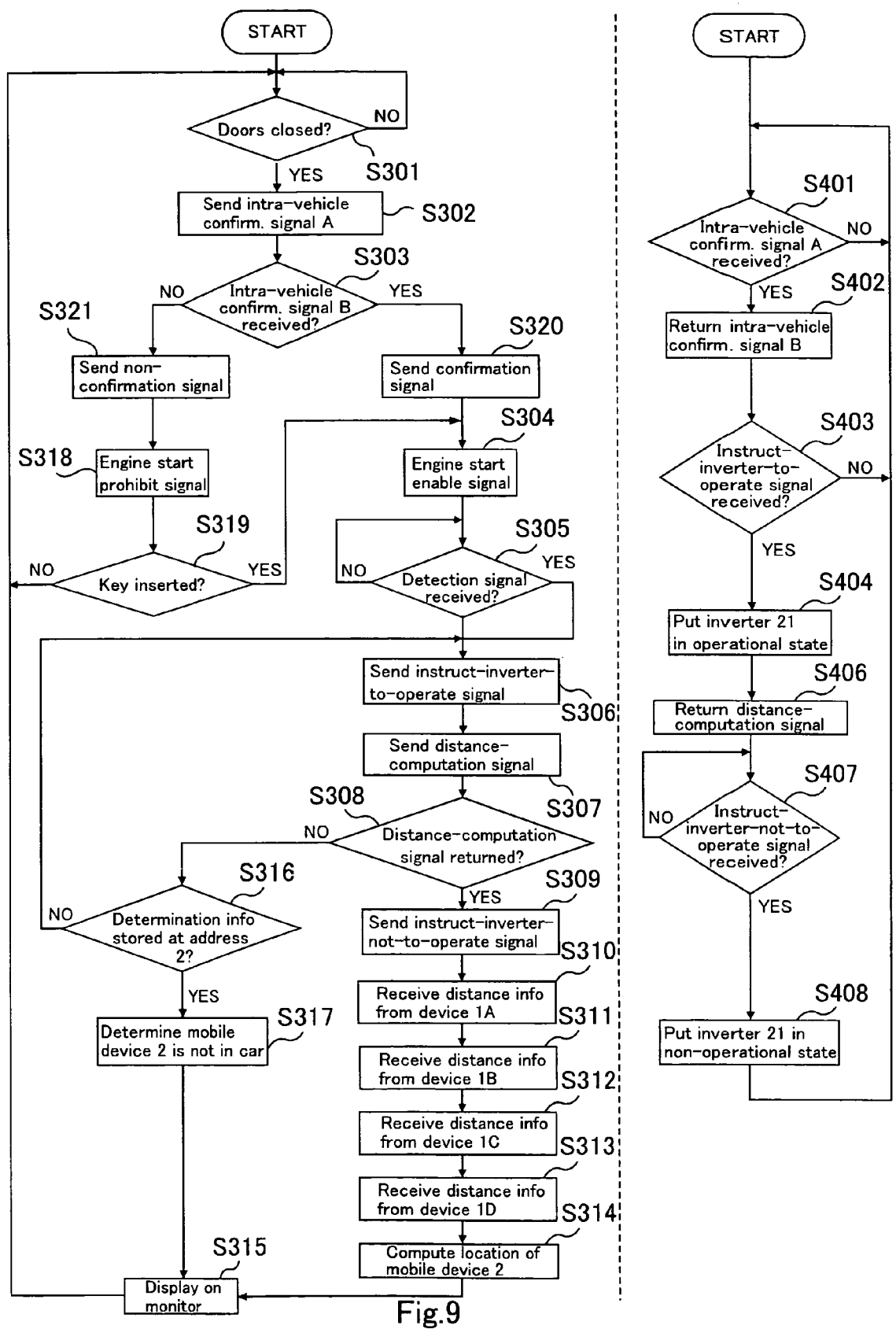
FIG. 9 is a flow chart showing an example of the operation of the distance calculation system according to the present invention.
Figure 11:
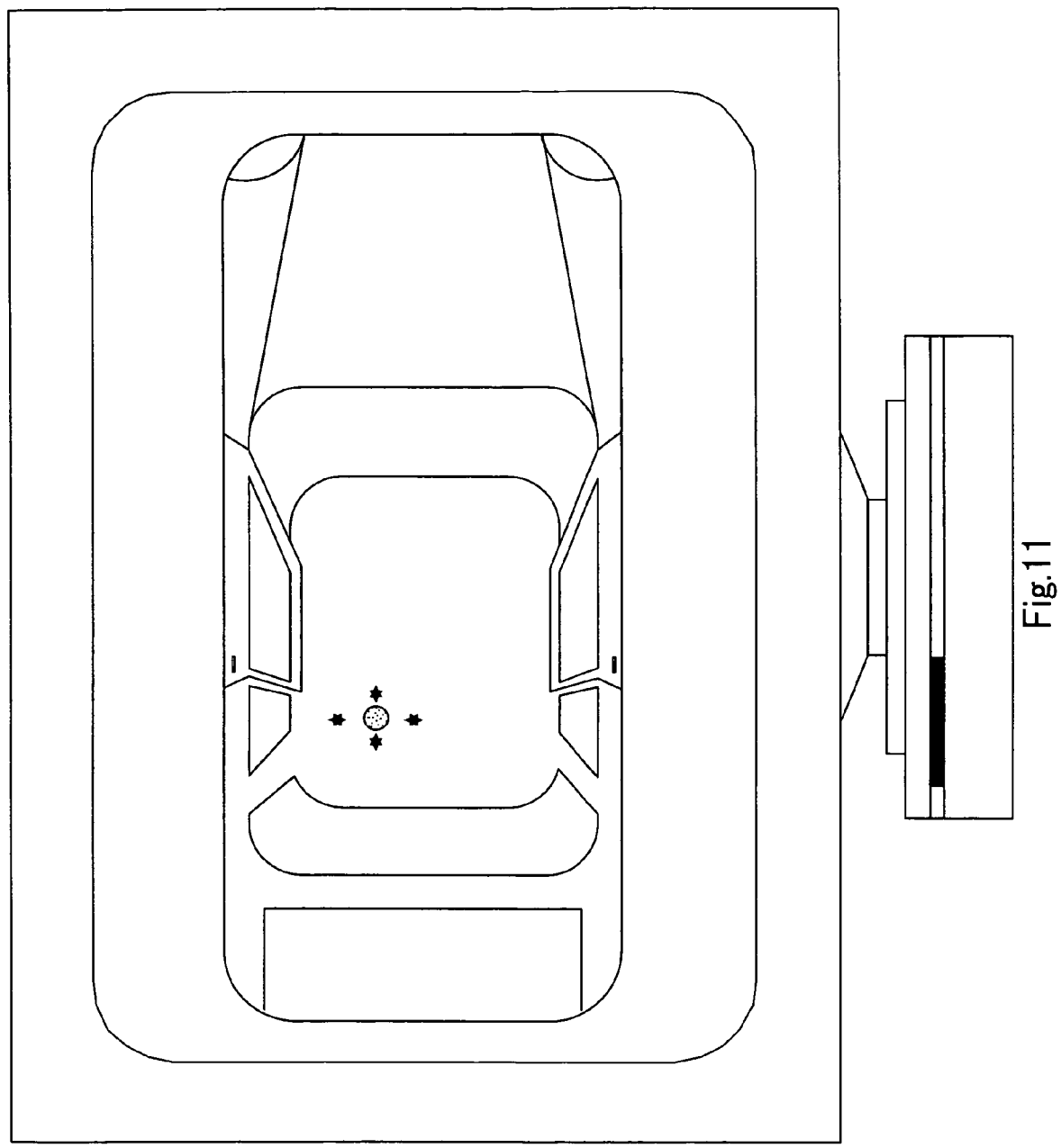
FIG. 11 shows an example of a display screen of a monitor 92.
Figure 12:
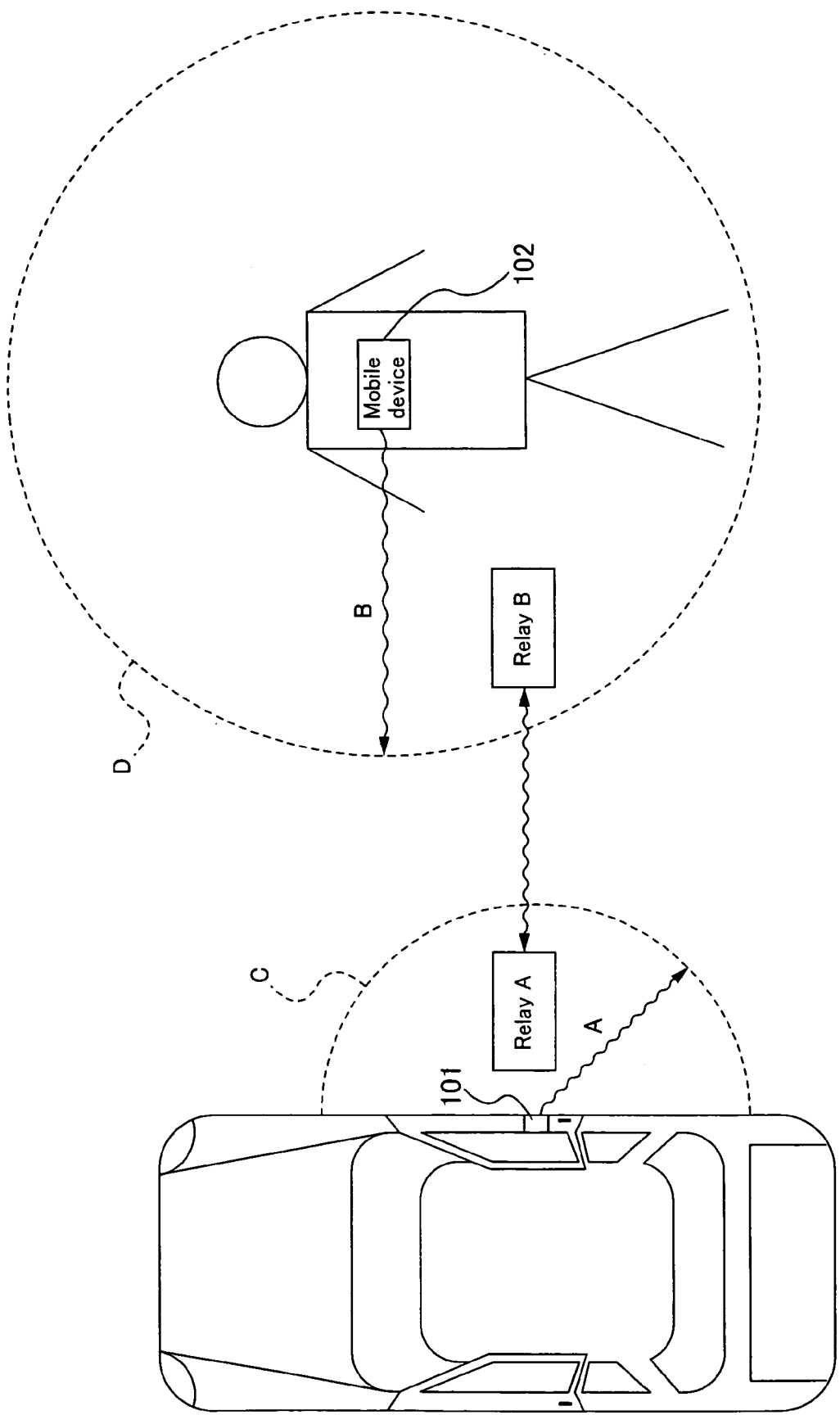
FIG. 12 is a diagram showing communications between an vehicle-mounted device 101 and a mobile device 102 via relays A and B.

The operation of the distance calculation system of the invention will be described with reference to FIGS. 8 to 11. FIG. 9 is a flow chart showing an example of the operation of the distance calculation system of the invention. FIG. 11 shows an example of a display screen of a monitor 92.

In the present implementation, description will be offered of the case where the wearer unlocked the door of the vehicle and has got in the vehicle and put the mobile device 2 somewhere in the vehicle and has forgotten whereabouts thereof. It is supposed that the inverter 21 is in the non-operational state.

The controller (not shown) separately provided in the vehicle receives a signal indicating the doors of the vehicle being closed (S301), and on the basis of the signal, sends the CPU 90 a signal to confirm whether to start the engine.

In response to the signal from the controller, the CPU 90 sends the vehicle-mounted devices 1A, 1B, 1C, 1D an instruction signal for the CPUs 3A, 3B, 3C, 3D to send the intra-vehicle confirmation signal A.

The operation of the vehicle-mounted device 1A will be described below, which applies to the vehicle-mounted devices 1B, 1C, 1D as well.

When receiving the instruction signal from the CPU 90, the CPU 3A sends the intra-vehicle confirmation signal A to the transmitter 7A (S302). At this time, the CPU 3A resets the timer 5A to start measuring time. Then, the CPU 3A checks whether the intra-vehicle confirmation signal B from the mobile device 2 demodulated by the receiver 8A is received within a predetermined time period (S303). The transmitter 7A ASK-modulates the intra-vehicle confirmation signal A with the carrier wave of 125 kHz in frequency. Then, the ASK-modulated intra-vehicle confirmation signal A from the transmitter 7A is transmitted via the transmit antenna 9A.

The receive antenna 18 of the mobile device 2 receives the ASK-modulated intra-vehicle confirmation signal A and the demodulator 24 demodulates the ASK-modulated intra-vehicle confirmation signal A. When determining that the intra-vehicle confirmation signal A demodulated by the demodulator 24 has been received (YES in S401), the CPU 11 sends the intra-vehicle confirmation signal B to the modulator 25 (S402). The modulator 25 FSK-modulates the intra-vehicle confirmation signal B with the carrier wave of 312 MHz in frequency. The intra-vehicle confirmation signal B FSK-modulated in the modulator 25 is transmitted via the transmit antenna 19.

The receive antenna 10A of the vehicle-mounted device 1A receives the FSK-modulated intra-vehicle confirmation signal B and the receiver 8A demodulates the FSK-modulated intra-vehicle confirmation signal B. When determining that the intra-vehicle confirmation signal B from the mobile device 2 demodulated by the receiver 8A has been received (YES in S303), the CPU 3A sends a confirmation signal to the CPU 90 (S320). Likewise, when determining that the intra-vehicle confirmation signal B from the mobile device 2 has been received, the CPUs 3B, 3C, 3D of the vehicle-mounted devices 1B, 1C, 1D send a confirmation signal to the CPU 90. On the other hand, if determining that the intra-vehicle confirmation signal B from the mobile device 2 demodulated by the receiver 8A has not been received within a predetermined time period of transmitting the intra-vehicle confirmation signal A (NO in S303), the CPU 3A sends a non-confirmation signal to the CPU 90 (S321).

On the basis of the confirmation signal from the vehicle-mounted devices 1A, 1B, 1C, 1D, the CPU 90 send the engine start enable signal to the controller (S304). The controller starts the engine of the vehicle to operate. Meanwhile, on the basis of the non-confirmation signal from the vehicle-mounted devices 1A, 1B, 1C, 1D, the CPU 90 send the engine start prohibit signal to the controller (S318). Thus, the controller does not allow the engine of the vehicle to operate until the key is inserted into the keyhole (S319).

In the case where the wearer put the mobile device 2 somewhere in the vehicle and has forgotten whereabouts thereof, the wearer enters an instruction to detect the mobile device 2 through an input unit (not shown). When receiving an instruction signal in response to the instruction entered to the input unit, the controller sends a detection signal to the CPU 90 in response to the instruction signal. When receiving the detection signal from the controller (YES in S305), the CPU 90 sends the vehicle-mounted devices 1A, 1B, 1C, 1D an instruction signal for the CPUs 3A, 3B, 3C, 3D to send the instruct-the-inverter-to-operate signal.

When receiving the instruction signal from the CPU 90, the CPU 3A sends the instruct-the-inverter-to-operate signal to the transmitter 7A (S306). The transmitter 7A ASK-modulates the instruct-the-inverter-to-operate signal with the carrier wave of 125 kHz in frequency. Then, the ASK-modulated instruct-the-inverter-to-operate signal from the transmitter 7A is transmitted via the transmit antenna 9A.

The receive antenna 18 of the mobile device 2 receives the ASK-modulated instruct-the-inverter-to-operate signal and the demodulator 24 demodulates the ASK-modulated instruct-the-inverter-to-operate signal. When determining that the instruct-the-inverter-to-operate signal demodulated by the demodulator 24 has been received (YES in S403), the CPU 11 puts the inverter 21 in the operational state (S404).

After sending the instruct-the-inverter-to-operate signal, the CPU 3A sends the distance-calculation signal to the transmitter 7A (S307). At this time, the CPU 3A resets the counter 4A to start counting from the rising edge of the distance-calculation signal. Also, the CPU 3A resets the timer 5A to start measuring time. Then, the CPU 3A checks whether the distance-calculation signal is returned from the mobile device 2 within a predetermined time period (S308). The transmitter 7 ASK-modulates the distance-calculation signal with the carrier wave of 125 kHz in frequency. Then, the ASK-modulated distance-calculation signal from the transmitter 7A is transmitted via the transmit antenna 9A.

The receive antenna 18 of the mobile device 2 receives the ASK-modulated distance-calculation signal, and the demodulator 24 demodulates the ASK-modulated distance-calculation signal. Here, the distance-calculation signal from the vehicle-mounted device 1A demodulated by the demodulator 24 is sent as it is to the modulator 25 because the inverter 21 is in the operational state (S406). The modulator 25 FSK-modulates the distance-calculation signal from the demodulator 24 with the carrier wave of 312 MHz in frequency. The distance-calculation signal FSK-modulated in the modulator 25 is transmitted via the transmit antenna 19.

The receive antenna 10A of the vehicle-mounted device 1A receives the FSK-modulated distance-calculation signal and the receiver 8A demodulates the FSK-modulated distance-calculation signal. When determining that the distance-calculation signal from the mobile device 2 demodulated by the receiver 8A has been received (YES in S308), the CPU 3A reads out the count of the counter 4A. Based on the count, the CPU 3A calculates the distance from the vehicle-mounted device 1A to the mobile device 2. The method of the CPU 3A calculating the distance from the vehicle-mounted device 1A to the mobile device 2 is the same as in the first implementation. Then, the CPU 3A sends the CPU 90 information about the distance from the vehicle-mounted device 1A to the mobile device 2 (S310). Likewise, the CPU 3B of the vehicle-mounted device 1B sends the CPU 90 information about the distance from the vehicle-mounted device 1B to the mobile device 2 (S311); the CPU 3C of the vehicle-mounted device 1C sends the CPU 90 information about the distance from the vehicle-mounted device 1C to the mobile device 2 (S312); and the CPU 3D of the vehicle-mounted device 1D sends the CPU 90 information about the distance from the vehicle-mounted device 1D to the mobile device 2 (S313). While calculating the distance from the vehicle-mounted device 1A to the mobile device 2, the CPU 3A sends the instruct-the-inverter-not-to-operate signal to the transmitter 7A (S309). The transmitter 7A ASK-modulates the instruct-the-inverter-to-operate signal with the carrier wave of 125 kHz in frequency. Then, the ASK-modulated instruct-the-inverter-not-to-operate signal from the transmitter 7A is transmitted via the transmit antenna 9A. If determining that the distance-calculation signal demodulated by the receiver 8A has not been received within the predetermined time period of transmitting the distance-calculation signal (NO in S308), the CPU 3A stores information indicating the determination that the distance-calculation signal has not been returned from, e.g., an address 2 in sequence in the Flash memory 6A. And the CPU 3A checks whether information indicating the determination that the distance-calculation signal has not been returned is stored at the address 2 (S316). If determining that the information is not stored at the address 2 (NO in S316), the CPU 3A sends the instruct-the-inverter-to-operate signal to the transmitter 7A again (S306). Further, the CPU 3A resets the timer 5A to start measuring time, and resets the counter 4A to start counting. And if determining again that the distance-calculation signal has not been returned (NO in S308), the CPU 3A stores information indicating the determination that the distance-calculation signal has not been returned at the address 2 in the Flash memory 6A (S316). The CPU 3A determines that the information indicating that the distance-calculation signal has not been returned is stored at the address 2 (YES in S316), and sends the CPU 90 a signal indicating the determination. If receiving the signal from the vehicle-mounted devices 1B, 1C, 1D as well as the vehicle-mounted device 1A, the CPU 90 determines that the mobile device 2 is not in the vehicle (S317). Then the CPU 90 sends the controller an instruction signal to display on the monitor 92 a message that the mobile device 2 is not in the vehicle. The controller, according to the instruction signal from the CPU 90, display on the monitor 92 the message that the mobile device 2 is not in the vehicle (S315).

As described above, when receiving the distance information from the vehicle-mounted devices 1A, 1B, 1C, 1D, the CPU 90 calculates where the mobile device 2 is in the vehicle based on the distance information (S314). Here, the location of the mobile device 2 is obtained, as described above, as the intersection point of the line of points which are at the distance from the vehicle-mounted device 1A as the start point calculated by the CPU 3A (denoted as a chain line A in FIG. 10), the line of points which are at the distance from the vehicle-mounted device 1B as the start point calculated by the CPU 3B (denoted as a chain double-doted line B in FIG. 10), the line of points which are at the distance from the vehicle-mounted device 1C as the start point calculated by the CPU 3C (denoted as a broken line C in FIG. 10), and the line of points which are at the distance from the vehicle-mounted device 1D as the start point calculated by the CPU 3D (denoted as a solid line D in FIG. 10). Then the CPU 90 sends the controller an instruction signal to display on the monitor 92 the location of the mobile device 2 obtained. The controller, according to the instruction signal from the CPU 90, display on the monitor 92 the location of the mobile device 2 (S315 of FIG. 11).

In this way, in the case where the wearer has forgotten where the mobile device 2 was put, the CPUs 3A, 3B, 3C, 3D calculate the distances from the vehicle-mounted devices 1A, 1B, 1C, 1D to the mobile device 2 and the CPU 90 calculates the location of the mobile device 2.

According to the above implementation, the CPU 3 can calculate the distance from the vehicle-mounted device 1 to the mobile device 2 from the phase difference between the distance-calculation signal when transmitted by the vehicle-mounted device 1 and the same when returned thereto from the mobile device 2. Because the distance from the vehicle-mounted device 1 to the mobile device 2 is calculated using the distance-calculation signal sent by the CPU 3 and the same distance-calculation signal returned from the mobile device 2, the distance can be reliably accurately calculated.

Moreover, by using the carrier wave of the low frequency for the communication from the vehicle-mounted device 1 to the mobile device 2, a phase difference is intentionally produced, and for the communication from the mobile device 2 to the vehicle-mounted device 1, the carrier wave of the high frequency is used thus producing a phase difference that is negligible compared with that of the communication from the vehicle-mounted device 1 to the mobile device 2. Hence, from the phase difference intentionally produced in the communication from the vehicle-mounted device 1 to the mobile device 2, the distance to the mobile device 2 can be calculated.

Yet further, if determining that the distance to the mobile device 2 calculated from the phase difference is at or above a predetermined distance, the CPU 3 stops communication with the mobile device 2. Hence, even if communication with the mobile device 2 is attempted with a relay, the communication with the mobile device 2 cannot be performed.

Still further, since changing the pattern of the distance-calculation signal on a per predetermined-number-of-the-signals basis, security can be improved against a person who attempts to read the distance-calculation signal with a reader. Since the CPU 3 repeats sending the distance-calculation signal until the distance-calculation signal is returned from the mobile device 2, the distance to the mobile device 2 can be reliably calculated.

In the communication from the vehicle-mounted device 1 to the mobile device 2 using the carrier wave of the low frequency, by using ASK-modulation suitable as modulation with the carrier wave of the low frequency, the circuit configuration becomes simple and enables the communication from the vehicle-mounted device 1 to the mobile device 2 even with a certain degree of cross talk. In the communication from the mobile device 2 to the vehicle-mounted device 1 using the carrier wave of the high frequency, by using FSK-modulation suitable as modulation with the carrier wave of the high frequency, the communication becomes not easily affected by noise and information can be transmitted from the mobile device 2 to the vehicle-mounted device 1 without loss.

Moreover, by using the timer 5 for detecting the phase difference, the counter 4 that counts clocks of a predetermined frequency, and the Flash memory 6 storing information used when the CPU 3 calculates the distance to the mobile device 2 based on the count, the CPU 3 can reliably calculate the distance to the mobile device 2. Furthermore, since the timer 5 and the counter 4 are reset each time the CPU 3 sends the distance-calculation signal, the CPU 3 is prevented from calculating the distance to the mobile device 2 from two distance-calculation signals having the same pattern, thus reliably calculating the distance to the mobile device 2.

Yet further, when the distance between the vehicle-mounted device 1 and the mobile device 2 is calculated and the CPU 3 determines that the distance is below a predetermined distance, the CPU 3 unlocks the door(s) of the vehicle. On the other hand, when determining that the distance is at or above the predetermined distance, the CPU 3 locks the door(s) of the vehicle. That is, the door(s) of the vehicle can be unlocked and locked without inserting a vehicle key into the key hole.

Still further, when determining that the distance between the vehicle-mounted device 1 and the mobile device 2 is at or above the predetermined distance, an alarm (not shown) may be activated. For example, when the determining section has made such determination while relays are involved, it can notify that relays are involved in communication.

==Other Implementations==

While the calculation of the distance from the vehicle-mounted device to the mobile device by the distance calculation system of the present invention has been described, the above description is provided to facilitate the understanding of the present invention and not intended to limit the present invention. It should be understood that various changes and alterations can be made therein without departing from spirit and scope of the invention.

<<Unlocking of Door(s) of Car<<

While in the above implementations, either the driver side door or all doors selected by the wearer switching the switch (not shown) are unlocked, the invention is not limited to this. For example, with the vehicle-mounted devices 1A, 1B, 1C, 1D, when the wearer has entered the area, the CPU 3A calculates the distance from the vehicle-mounted device 1A to the mobile device 2, the CPU 3B calculates the distance from the vehicle-mounted device 1B to the mobile device 2, the CPU 3C calculates the distance from the vehicle-mounted device 1C to the mobile device 2, and the CPU 3D calculates the distance from the vehicle-mounted device 1D to the mobile device 2. Then, the CPU 90 can determine whether the wearer of the mobile device 2 is approaching the vehicle on the driver side based on the distance information from the CPUs 3A, 3B, 3C, 3D. For example, in FIG. 10, if the distance calculated by the CPU 3B of an vehicle-mounted device 32 is greater than the distance calculated by the CPU 3A of an vehicle-mounted device 31, the CPU 90 determines that the wearer is approaching the vehicle on the passenger side. Here, the CPU 90 may be set to instruct the controller to unlock the passenger side door if the wearer has selected the unlocking of the driver side door through the switch.

<<Application of Distance Calculation System<<

While in the above implementations, the distance calculation system is used for vehicle-mounted devices of the passive keyless entry system which locks and unlocks the door(s) of the vehicle without the operation of the key, the invention is not limited to this.

For example, having persons whose locations need to be identified such as kids or the elderly (hereinafter called monitored objects) carry the mobile device 2, a monitor manages a monitoring apparatus having the same function as the vehicle-mounted device 1 to monitor the monitored object. The monitoring apparatus checks whether the intra-area confirmation signal B is transmitted from the mobile device 2 in response to the intra-area confirmation signal A from the monitoring apparatus, and thereby, the monitor can determine whether the monitored object is within the communication-feasible range. When the monitoring apparatus determines that the intra-area confirmation signal B has not been transmitted from the mobile device 2 being carried by the monitored object, the monitoring apparatus, e.g., sounds an alarm to notify the monitor that the monitored object has gone outside the communication-feasible range. Thus, the monitor can arrange for the monitored object to be protected quickly. Moreover, an identification code may be arranged to be stored in the Flash memory 13 of the mobile device 2 being carried by each monitored object, and along with the intra-area confirmation signal B may be transmitted by the mobile device 2. By this means, the monitor can find who of the monitored objects has gone outside the communication-feasible range. Furthermore, a plurality of monitoring apparatuses may be provided as in the second implementation, and the plurality of monitoring apparatuses transmit the intra-area confirmation signal A. If the monitored object has gone outside the communication-feasible range, the monitor can easily find in which direction he/she has gone outside the communication-feasible range based on the intra-area confirmation signal B received by the plurality of monitoring apparatuses immediately before he/she goes outside the range. This is because, the monitoring apparatuses determining whether the intra-area confirmation signal B is transmitted within the predetermined time period t1 of transmitting the intra-area confirmation signal A, a monitoring apparatus closest to the monitored object has the intra-area confirmation signal B reach it earliest. Hence, the direction in which he/she has gone outside the communication-feasible range can be determined from the location of the monitoring apparatus closest to the monitored object. Thus, the monitor can reliably monitor the monitored object, and it can be avoided that an accident occurs because the monitored object is out of the communication-feasible range. Furthermore, when the monitored object has gone outside the communication-feasible range, the monitoring apparatus determines that the intra-area confirmation signal B has not been transmitted from the mobile device 2, and transmits the distance-calculation signal. If relays are involved in communication between the mobile device 2 and the monitoring apparatus, the distance-calculation signal is returned to the monitoring apparatus via the relays. Hence, having calculated the distance between the mobile device 2 and the monitoring apparatus from the phase difference between the distance-calculation signal transmitted and the same from the mobile device 2, the monitoring apparatus determines that the calculated distance between the mobile device 2 and the monitoring apparatus is not less than a predetermined distance. In this way, the monitor can easily determine that the monitored object remains out of the communication-feasible range. Thus, the monitored object can be prevented from, e.g., being abducted by the person carrying the relay.

The mobile device 2 may be used as a key for home. In this case, a management apparatus having the same function as the vehicle-mounted device 1 may be provided in the home's door, so that the home's door can be locked and unlocked without the operation of the key. If a relay is involved in communication between the mobile device 2 and the management apparatus, the management apparatus determines that the distance between the mobile device 2 and the management apparatus calculated by the management apparatus is not less than a predetermined distance, and stops the communication with the mobile device 2. Thus, security is improved and a thief or the like attempting to intrude into the home via the relay can be prevented from causing harm. The invention can be applied to the entrance of other kinds of buildings.

Moreover, the mobile device 2 may be provided in a valuable item. When the valuable item provided with the mobile device 2 is lost, a search apparatus having the same function as the vehicle-mounted device 1 transmits the distance-calculation signal. As the search apparatus approaches the valuable item provided with the mobile device 2, the mobile device 2 comes to return the distance-calculation signal from the search apparatus. From the distance-calculation signal returned from the mobile device 2 to the search apparatus, the search apparatus can calculate the distance to the mobile device 2. When the distance to the mobile device 2 calculated by the search apparatus reaches a predetermined distance, by, e.g., sounding an alarm, it can be notified to the person carrying the search apparatus that the valuable item is in its vicinity.

Yet further, a power meter or the like may be configured to have the same function as the vehicle-mounted device 1. In this case, a reader for the power meter or the like is arranged to carry the mobile device 2. The power meter transmits the distance-calculation signal to determine whether the mobile device 2 is within a predetermined distance. The power meter may be set to transmit measured data of the power meter to the mobile device 2 being carried by the reader when determining that the mobile device 2 is within a predetermined distance. By this means, measured data can be collected from the power meter without contact with the power meter. In these years, while measured data of power meters and the like can be collected through the Internet, there is the possibility that the measured data may be read by a third party. However, by using the power meter and the mobile device 2 described above to collect measured data, the possibility that the measured data may be read by a third party can be eliminated improving security. Furthermore, if a relay is involved in communication between the mobile device 2 and the power meter, the power meter determines that the distance between the mobile device 2 and the power meter calculated by the power meter is not less than a predetermined distance, and stops the communication with the mobile device 2. Thus, the measured data of the power meter can be prevented from being read via the relay.

Still further, persons who need protection by guardians such as children may be arranged to carry the mobile device 2, and electric poles may be provided with a search apparatus having the same function as the vehicle-mounted device 1. For example, if a child carrying the mobile device 2 is abducted, information can be obtained from them to track the child. In this case, the search apparatuses provided on the electric poles transmit the distance-calculation signal. If the child carrying the mobile device 2 passes by an electric pole having the search apparatus, the mobile device 2 returns the distance-calculation signal to the search apparatus. Then, the search apparatus calculates the distance to the mobile device 2, and stores information about the time when the distance-calculation signal from the mobile device 2 was received in, e.g., the Flash memory 6. And for example, by reading out the time information stored in the Flash memory 6 of the search apparatus, the police can determine when the child passed and how far apart his path was. By delivering the time information of the search apparatus through a communication network to the guardian of the child or the like, the whereabouts of the child can be notified. Further, the alarm of the mobile device 2 may be arranged to issue an alarm if a relay is involved in communication between the mobile device 2 and the search apparatus. Hence, the guardian of the child or the like becomes early aware that there is the possibility that the child may be, e.g., abducted by someone carrying the relay, and the abduction of the child can be prevented by the guardian or the like.

What is claimed is:

1. A communication device comprising:
   a transmitter that transmits a distance-calculation signal with which to calculate a distance to a partner communication device;
   a detector that receives the distance-calculation signal returned from the partner communication device and detects a phase difference between the distance-calculation signal when transmitted and the distance-calculation signal when received;
   a calculator that calculates the distance to the partner communication device based on the phase difference detected by the detector;
   a modulator that modulates the distance-calculation signal with a carrier wave of a first frequency; and
   a demodulator that demodulates the distance-calculation signal that has been modulated with a carrier wave of a second frequency higher than the first frequency and returned by the partner communication device after received from the modulator and demodulated by the partner communication device,
   wherein the modulator ASK-modulates the distance-calculation signal with the carrier wave of the first frequency, and
   wherein the demodulator demodulates the distance-calculation signal that has been FSK-modulated with the carrier wave of the second frequency and returned by the partner communication device.

2. The communication device according to claim 1, further comprising:
   a determining section that determines whether the distance to the partner communication device calculated by the calculator is below a predetermined distance,
   wherein when the determining section determines that the distance to the partner communication device calculated by the calculator is at or above the predetermined distance, the communication device stops communication with the partner communication device on the basis of the determining result.

3. The communication device according to claim 1, further comprising:
   a generator that generates the distance-calculation signal,
   wherein the transmitter repeatedly transmits the distance-calculation signal generated by the generator until receiving the distance-calculation signal returned from the partner communication device, and
   wherein each predetermined number of times that the distance-calculation signal is generated, the generator changes a pattern of the distance-calculation signal.

4. The communication device according to claim 1, further comprising:
   a timer that is reset each time the transmitter transmits the distance-calculation signal and measures a time period until the distance-calculation signal returned by the partner communication device is received;
   a counter that is reset each time the timer is reset and counts clocks of a predetermined frequency for the phase difference to be detected by the detector; and
   a storage that stores distance information based on which the calculator calculates the distance to the partner communication device from the count of the counter,
   wherein the detector detects the time period measured by the timer as the phase difference between the distance-calculation signal when transmitted and the distance-calculation signal when received, and
   wherein the calculator reads out a piece of the distance information corresponding to the count of the counter counting clocks of the predetermined frequency for the phase difference from the storage and calculates the distance to the partner communication device from the distance information piece.

5. The communication device according to claim 2, which is provided in a vehicle and, when the determining section determines that the distance to the partner communication device calculated by the calculator is below the predetermined distance, supplies a controller controlling unlock/lock of a door of the vehicle with a signal to unlock the door indicating the determining result, and
   when the determining section determines that the distance to the partner communication device calculated by the calculator is at or above the predetermined distance, supplies the controller with a signal to lock the door indicating the determining result.

6. A communication device capable of communicating with a partner communication device which transmits a distance-calculation signal with which to calculate a distance to the communication device, receives the distance-calculation signal returned, detects a phase difference between the distance-calculation signal when transmitted and the distance calculation signal when received, and calculates the distance to the communication device based on the phase difference, the communication device comprising:
   a send-back section that returns the distance-calculation signal transmitted by the partner communication device;
   a demodulator that demodulates the distance-calculation signal modulated with a carrier wave of a first frequency and transmitted from the partner communication device; and
   a modulator that modulates the distance-calculation signal demodulated by the demodulator, with a carrier wave of a second frequency higher than the first frequency,
   wherein the demodulator demodulates the distance-calculation signal that has been ASK-modulated with the carrier wave of the first frequency and transmitted by the partner communication device, and
   wherein the modulator FSK-modulates the distance-calculation signal demodulated by the demodulator, with the carrier wave of the second frequency.

7. The communication device according to claim 6, further comprising:
   a switch that puts the send-back section in an operational state so as to return the distance-calculation signal,
   wherein the switch puts the send-back section in the operational state according to a switching signal from the partner communication device to put the send-back section in the operational state.

8. The communication device according to claim 6, further comprising: an alarm that issues an alarm,
   wherein the alarm issues an alarm according to an alarm signal from the partner communication device to cause the alarm to issue an alarm.

9. A distance calculation system which calculates a distance between first and second communication devices, wherein the first communication device comprises:
   a transmitter that transmits a distance-calculation signal with which to calculate a distance to the second communication device;
   a detector that receives the distance-calculation signal returned from the second communication device and detects a phase difference between the distance-calculation signal when transmitted and the distance-calculation signal when received; and a calculator that calculates the distance to the second communication device based on the phase difference detected by the detector, and wherein the second communication device comprises:

a send-back section that returns the distance-calculation signal transmitted by the first communication device and a switch that puts the send-back section in an operational state to return the distance-calculation signal, wherein the first communication device transmits a switching signal to put the send-back section in the operational state so that the calculator calculates the distance to the second communication device, and the switch puts the send-back section in the operational state according to the switching signal from the first communication device.

10. The distance calculation system according to claim 9, wherein the first communication device further comprises:

a first modulator that modulates the distance-calculation signal with a carrier wave of a first frequency; and a first demodulator that demodulates the distance-calculation signal that has been modulated with a carrier wave of a second frequency higher than the first frequency and returned by the second communication device, and wherein the second communication device further comprises a second demodulator that demodulates the distance-calculation signal modulated by the first modulator and transmitted by the first communication device; and a second modulator that modulates the distance-calculation signal demodulated by the second demodulator with the carrier wave of the second frequency.

11. The distance calculation system according to claim 9, wherein the first communication device further comprises:

a determining section that determines whether the distance between the first and second communication devices calculated by the calculator is below a predetermined distance, wherein when the determining section determines that the distance between the first and second communication devices calculated by the calculator is at or above the predetermined distance, the first communication device stops communication with the second communication device on the basis of the determining result.

12. The distance calculation system according to claim 9, wherein the first communication device further comprises:

a generator that generates the distance-calculation signal, wherein the transmitter repeatedly transmits the distance-calculation signal generated by the generator until the first communication device receives the distance-calculation signal returned from the second communication device, and wherein each predetermined number of times that the distance-calculation signal is generated, the generator changes a pattern of the distance-calculation signal.

13. The distance calculation system according to claim 10, wherein the first modulator ASK-modulates the distance-calculation signal with the carrier wave of the first frequency, and the second demodulator demodulates the distance-calculation signal ASK-modulated by the first modulator and transmitted by the first communication device, and wherein the second modulator FSK-modulates the distance-calculation signal demodulated by the second demodulator with the carrier wave of the second frequency, and the first demodulator demodulates the distance-calculation signal FSK-modulated by the second modulator and returned by the second communication device.

14. The distance calculation system according to claim 10, wherein in order to perform communication between the first and second communication devices using spread spectrum, the first modulator first-order-modulates the distance-calculation signal with the carrier wave of the first frequency, and then second-order-modulates or spreads the distance-calculation signal first-order-modulated with the carrier wave of the first frequency, and the second demodulator despreads the distance-calculation signal second-order-modulated or spread by the first modulator and transmitted by the first communication device thereby demodulating the signal, and wherein the second modulator first-order-modulates the distance-calculation signal demodulated by dispreading by the second demodulator with the carrier wave of the second frequency, and then second-order-modulates or spreads the distance-calculation signal first-order-modulated with the carrier wave of the second frequency, and the first demodulator despreads the distance-calculation signal second-order-modulated or spread by the second modulator and returned by the second communication device thereby demodulating the signal.

15. The distance calculation system according to claim 9, wherein the first communication device further comprises:

a timer that is reset each time the transmitter transmits the distance-calculation signal and measures a time period until the first communication device receives the distance-calculation signal returned by the second communication device;

a counter that is reset each time the timer is reset and counts clocks of a predetermined frequency for the phase difference to be detected by the detector; and a storage that stores information based on which the calculator calculates the distance between the first and second communication devices from the count of the counter, wherein the detector detects the time period measured by the timer as the phase difference between the distance-calculation signal when transmitted and the distance-calculation signal when received, and wherein the calculator calculates the distance between the first and second communication devices based on the count of the counter counting clocks of the predetermined frequency for the phase difference and the information stored in the storage.

16. The distance calculation system according to claim 11, wherein the first communication device is provided in a vehicle and, when the determining section determines that the distance between the first and second communication devices calculated by the calculator is below the predetermined distance, supplies a controller controlling unlock/lock of a door of the vehicle with a signal to unlock the door indicating the determining result, and when the determining section determines that the distance between the first and second communication devices calculated by the calculator is at or above the predetermined distance, supplies the controller with a signal to lock the door indicating the determining result.

17. The distance calculation system according to claim 11, wherein the second communication device further comprises an alarm that issues an alarm, wherein the first communication device transmits an alarm signal to cause the alarm to issue an alarm on the basis of the result of the determining section determining that the distance between the first and second communication devices calculated by the calculator is at or above the predetermined distance, and wherein the alarm issues an alarm according to the alarm signal from the first communication device.

18. A communication device comprising:

a transmitter that transmits a distance-calculation signal with which to calculate a distance to a partner communication device;

a detector that receives the distance-calculation signal returned from the partner communication device and detects a phase difference between the distance-calculation signal when transmitted and the distance-calculation signal when received;

a calculator that calculates the distance to the partner communication device based on the phase difference detected by the detector;

a timer that is reset each time the transmitter transmits the distance-calculation signal and measures a time period until the distance-calculation signal returned by the partner communication device is received;

a counter that is reset each time the timer is reset and counts clocks of a predetermined frequency for the phase difference to be detected by the detector; and a storage that stores distance information based on which the calculator calculates the distance to the partner communication device from the count of the counter, wherein the detector detects the time period measured by the timer as the phase difference between the distance-calculation signal when transmitted and the distance-calculation signal when received, and wherein the calculator reads out a piece of the distance information corresponding to the count of the counter counting clocks of the predetermined frequency for the phase difference from the storage and calculates the distance to the partner communication device from the distance information piece.

19. A distance calculation system which calculates a distance between first and second communication devices, wherein the first communication device comprises:

a transmitter that transmits a distance-calculation signal with which to calculate a distance to the second communication device;

a detector that receives the distance-calculation signal returned from the second communication device and detects a phase difference between the distance-calculation signal when transmitted and the distance-calculation signal when received;

a calculator that calculates the distance to the second communication device based on the phase difference detected by the detector;

a first modulator that modulates the distance-calculation signal with a carrier wave of a first frequency; and a first demodulator that demodulates the distance-calculation signal that has been modulated with a carrier wave of a second frequency higher than the first frequency and returned by the second communication device, and wherein the second communication device comprises a send-back section that returns the distance-calculation signal transmitted by the first communication device;

a second demodulator that demodulates the distance-calculation signal modulated by the first modulator and transmitted by the first communication device; and a second modulator that modulates the distance-calculation signal demodulated by the second demodulator with the carrier wave of the second frequency, wherein in order to perform communication between the first and second communication devices using spread spectrum, the first modulator first-order-modulates the distance-calculation signal with the carrier wave of the first frequency, and then second-order-modulates or spreads the distance-calculation signal first-order-modulated with the carrier wave of the first frequency, and the second demodulator despreads the distance-calculation signal second-order-modulated or spread by the first modulator and transmitted by the first communication device thereby demodulating the signal, and wherein the second modulator first-order-modulates the distance-calculation signal demodulated by dispreading by the second demodulator with the carrier wave of the second frequency, and then second-order-modulates or spreads the distance-calculation signal first-order-modulated with the carrier wave of the second frequency, and the first demodulator despreads the distance-calculation signal second-order-modulated or spread by the second modulator and returned by the second communication device thereby demodulating the signal.

20. A distance calculation system which calculates a distance between first and second communication devices, wherein the first communication device comprises:

a transmitter that transmits a distance-calculation signal with which to calculate a distance to the second communication device;

a detector that receives the distance-calculation signal returned from the second communication device and detects a phase difference between the distance-calculation signal when transmitted and the distance-calculation signal when received;

a calculator that calculates the distance to the second communication device based on the phase difference detected by the detector;

a timer that is reset each time the transmitter transmits the distance-calculation signal and measures a time period until the first communication device receives the distance-calculation signal returned by the second communication device;

a counter that is reset each time the timer is reset and counts clocks of a predetermined frequency for the phase difference to be detected by the detector; and a storage that stores information based on which the calculator calculates the distance between the first and second communication devices from the count of the counter, wherein the detector detects the time period measured by the timer as the phase difference between the distance-calculation signal when transmitted and the distance-calculation signal when received, and wherein the calculator calculates the distance between the first and second communication devices based on the count of the counter counting clocks of the predetermined frequency for the phase difference and the information stored in the storage, and wherein the second communication device comprises a send-back section that returns the distance-calculation signal transmitted by the first communication device.

* * * * *